United States Patent [19]

Kuehnle

[11] Patent Number: 4,788,426
[45] Date of Patent: Nov. 29, 1988

[54] INTERACTIVE IMAGE RECORDING METHOD AND MEANS

[76] Inventor: Manfred R. Kuehnle, P.O. Box 1020, Rt. 103A, New London, N.H. 03257

[21] Appl. No.: 872,891

[22] Filed: Jun. 11, 1986

[51] Int. Cl.$^4$ .......................... H01J 37/21; H04N 1/00
[52] U.S. Cl. .................................. 250/327.2; 250/311; 358/256; 354/3; 355/14 R
[58] Field of Search ............................. 250/327.2, 311; 358/256, 284; 354/3; 355/3 R, 4, 14 R

[56] References Cited

U.S. PATENT DOCUMENTS

| | | | |
|---|---|---|---|
| 3,069,551 | 12/1962 | Haine | 250/327.2 |
| 3,864,035 | 2/1975 | Kuehnle | 355/14 R |
| 4,395,636 | 7/1983 | Anger et al. | 250/569 |
| 4,618,767 | 10/1986 | Smith et al. | 250/311 |
| 4,651,220 | 3/1987 | Hosoi et al. | 250/311 |
| 4,694,171 | 9/1987 | Hosoi et al. | 250/311 |

Primary Examiner—Janice A. Howell
Attorney, Agent, or Firm—Nutter, McClennen & Fish

[57] ABSTRACT

An electronic read/write or microscope-camera system which can receive and store very low energy optical and equivalent electronic signals on a special optoelectronic tape or medium as varying charge density distributions over the imaged frame. Images are retrieved from the tape or medium by scanning the tape or medium with a focused electron beam which causes the tape or medium to emit secondary electrons as a charge density modulated return beam current. The electrons in the return beam are collected and amplified to develop an electrical signal representative of the image stored on the tape or medium. A method of applying images to and retrieving them from the tape or medium is also disclosed.

31 Claims, 6 Drawing Sheets

INTERACTIVE IMAGE RECORDING METHOD AND MEANS

This invention relates to method and apparatus for acquiring and storing an electronic latent image of a scene in a field of view and for reducing that stored image to visible form for purposes of reproduction and/or display. It relates more particularly to an improved technique for taking pictures electronically and for displaying or printing those pictures after they are taken.

BACKGROUND OF THE INVENTION

Most modern photographic reproduction systems and cameras are based on either the use of silver halide film, or the employment of solid state electronic photosensors for image detection to drive a display, or the use of an electron beam tube whose sensing surface receives an image and is scanned with an electron beam for one-time read-out and separate storage of the detected picture signals. While all of these prior systems work reasonably well, each has certain disadvantages. For example, those cameras using film require relatively complex shutter mechanisms, and the film, which is not reusable, must be developed chemically in order to obtain the picture. Electronic solid state sensor-type cameras tend to be relatively large and complicated machines which are relatively expensive to make. Those electronic cameras which utilize an electron beam tube, such as a vidicon tube require a video tape or other storage medium to reproduce the pictures acquired by the tube. That is, they store the picture information in analog or digital form on a separate magnetic medium. That medium imposes significant limitations on the amount of image information that can be stored, thus limiting the quality of the reproductions made from the sensed data. A disc or tape buffer memory also makes that type of camera quite bulky, costly and necessitates large electrical power supplies. It would be desirable, therefore, to provide a new type of camera which can take a series of snapshots electronically and reproduce those pictures without the need to store the picture information on buffer storage media, such as video tapes or video disks.

There have been some efforts in the past to produce materials which can sense and simultaneously store optical images on multiple layer materials and subsequently produce hard copy output. One of these approaches called the Katsuragawa process and its derivative, the so-called Canon NP process, were developed to form electrostatic images for office copying products. Both of these old processes use a photoconductive medium comprising a photoconductive layer and a superimposed dielectric layer. The photoconductive layer modulates an incoming light image to create an electrical charge pattern across the dielectric layer. Toner is then applied to the medium to develop the image. These processes require precise interactions of corona ionic charging of the medium, light exposure while countercharging of the medium and subsequent blanket exposure of the medium to form a stabilized electronic image across the medium's dielectric layer. Furthermore, the Katsuragawa and Canon processes need a gas plasma or open-air environment in order to function; they also require significant amounts of incoming light, i.e., a very intense light image, for exposure because the recording medium used in those processes have relatively poor sensitivities. Also, these prior techniques obtain only limited resolutions and they are not capable of acquiring and storing color images of photographic quality at photographic speeds.

Another approach to the development of an electronic camera system is described in U.S. Pat. No. 3,864,035 (Kuehnle). This camera also utilizes an electrographic recording medium comprising superimposed photoconductive and dielectric layers. The medium is exposed to a light image and simultaneously, a corona-prducing device charges the surface of the medium to a peak voltage dependant upon the intensity of the incoming light. Due to the different light and dark decay characteristics of the medium, an electronic charge distribution develops across the surface of the medium's dielectric layer. That charge pattern corresponds to the incoming light image and immediately toner is applied to the surface of the medium to develop that electrostatic image before it decays. Thus, that patented camera utilizes well known xerographic and electrofax copying techniques and the value of that prior arrangement resides in the packaging of the various components that carry out those well known processes into a small camera-size envelope. As noted, the recording medium described in that patent can store an acquired image for only a very short time so that the image must be developed by toner almost simultaneously with its acquisition. This presents certain timing problems, it also requires that the camera incorporate a complete toning station which increases the size, complexity and cost of the camera.

That prior camera system also has a low photospeed, making it commercially not viable. Large amounts of light are required to create an image on the medium, comparable to the exposures needed in xerographic copiers, e.g., ASA 1.

Another disadvantage of that camera system stems from its utilization of an electrographic recording medium incorporating a substrate or base through which the image being acquired is projected that is made of an organic plastic material, such as polyester, polyethylene or the like. Although that substrate is quite optically clear when the medium is new, due to its low abrasion resistance, its optical properties begin to deteriorate rapidly when the medium is used, because scratch marks accumulate on its surface.

Furthermore, the medium described in that patented system, even if it could retain an acquired image for a reasonable period of time, cannot be read-out by the most effective technique, namely electron beam scanning. This is because such scanning must take place in a vacuum and outgassing from the medium's organic components, particularly the base, produces a sharply reduced vacuum besides causing ion/electron collisions in the scanning beam and effecting the beam electrode, making impossible the retrieval of quality images. Since, out of necessity, development by toner rather than electron beam scanning is utilized in that prior system, it becomes essential that the recording medium is discharged by exposure to a potential near zero in the brightly illuminated areas; only then is it possible to develop the image without pronounced fog in the theoretically clear areas of the picture. This means that the lighter areas of the medium require saturation exposure to accommodate the innate fogging problem with the toner.

Another electronic imaging technique that does permit retrieval by electron beam scanning of an electronically stored image is disclosed in the publication *Electrostatic Imaging and Recording* by E. C. Hutter et al, Journal of the S.M.P.T.E., Vol. 69, January 1960, pp. 32-35. The recording medium or "phototape" in that reference, also disclosed in U.S. Pat. No. 3,124,456 (Moore), comprises a transparent polyester base coated on one side with a layer of photoconductive material which is, in turn, coated with a thin layer of a dielectric material. To record an image on the medium, the dielectric layer is precharged by a voltage applied across that layer and then the photoconductive layer is exposed to a light image while an electric field is applied across the dielectric layer. The charge on the dielectric layer decays toward zero with the decay being most rapid where the optical image is brightest and, therefore, the photoconductive resistance is the lowest. After a time corresponding to the greatest difference between the potentials in the light and dark areas of the medium, the electric field is turned off and the discharging process stops, thereby leaving on the dielectric layer an electrostatic charge distribution corresponding to the optical image incident in the medium. The stored image may be developed by applying toner to the medium or it may be read from the medium by scanning the dielectric layer with a focused electron beam to produce an electrical signal corresponding to the stored image.

Since the Hutter et al system employs a recording medium incorporating an organic plastic substrate, it has the same disadvantages as the patented camera discussed above. Also, in that system, a voltage must be applied to the recording medium prior to exposure in order to precharge the dielectric layer of that medium. Since the precharge bears no relationship to the brightness of the scene, particularly in its dark areas, the image may be totally under- or over-exposed, making it difficult to read. Also, due to imperfections and defects in the medium's active layers, that precharge may vary across the surface area of the medium and is, therefore, not dependable as an exposure reference potential.

That arrangement has several other disadvantages as well which seriously limit, if not prevent, its practical application. More particularly, the phototape used in the Hutter et al system has poor light sensitivity comparable to the very slowest silver halide films, i.e., ASA 1-10. Furthermore, it can store the acquired data on the medium for only a limited period of time, e.g., a few weeks, because of charge leakage in the dielectric layer of the medium. In other words, using a brute force approach, the Hutter et al system achieves exposure of the recording medium along a portion of the charge vs. exposure characteristic curve for that medium yielding only up to eight levels of the grey scale. Accordingly, the quality of the images acquired by that system are not very high. That being the case, it is not surprising that the pictures retrieved from the medium by electron beam scanning are of poor quality and inferior to silver halide film. Furthermore, read-out of the image stored on the medium is accomplished by detecting a capacitively modulated current signal from the medium involving simultaneous movement of many charge carriers in the medium. Resultantly, the resolution of the detected picture signal is less than that of the stored electronic image which, as just stated, was fairly poor to begin with.

Still further, in the process of reading the stored image for display or reproduction, that image is degraded by electronic conduction caused in the medium by the electron beam scanning process itself. In other words, when the Hutter et al system performs a read operation, it also tends to erase the image stored on the medium. This, of course, is completely unacceptable if that system is to be considered for long or short term storage of optical images which may have to be retrieved several times during the storage period.

Other recording systems are disclosed in U.S. Pat. Nos. 3,880,514 and 4,242,433 to Kuehnle et al which do not require precharging of the recording medium. Rather, those systems charge and expose the medium simultaneously. In that respect, they are superior to the Hutter et al recording system; otherwise they are disadvantaged in the same respects as the latter system.

SUMMARY OF THE INVENTION

Thus, it is an objective of this invention to provide an interactive electronic image recording apparatus in the nature of a microscope or camera system for the acquisition, storage and retrieval of optical images in order to compare, view and/or reproduce the acquired optical data.

Another object of the invention is to provide a system such as this which has automatic exposure control and focus capabilities.

A further object of the invention is to provide an image acquisition and storage system which can record optical images at a high photospeed and store said images for a period of several years in parallel form for subsequent retrieval and further electronic processing in a serial manner.

Yet another object of the invention is to provide a system which records an incoming light image on an optoelectronic storage medium in a manner that produces substantially no information loss.

Still another object of the invention is to provide an optical signal acquisition and recording system in which the recording medium interacts or cooperates with other components of the system including an exposure/contrast meter and an electron source for optimizing conditions to capture the maximum amount of information in the incoming light image.

A further object of the invention is to provide such image recording apparatus in the nature of a microscope or camera that can take high quality pictures electronically both in black and white and in color.

Another object of the invention is to provide an apparatus in the nature of a microscope or camera for retrieving and displaying or reproducing latent photographic images stored electronically on phototape.

A further object of the invention is to provide such interactive recording apparatus in the form of a shutterless camera with an autofocus capability.

Another object of the invention is to provide a microscope-camera system which can store a large amount of information for a long period of time on a tape-like optoelectronic recording medium which can be scanned by an electron beam to read the stored information for display or reproduction purposes.

Another object of the invention is to provide such a recording system whose recording medium has segments or frames for displaying scenes in a field of view interspersed with frames for storing electronic images of those scenes.

It is also an object of the invention to provide a system which records pictures electronically on a recording medium which, in situ, can be erased and reused in whole or in part a multiplicity of times.

A further object of the invention is to provide a system for storing electromagnetic signals on a recording medium as an electronic pattern and for reading that information from the medium in a manner that does not degrade the stored pattern which after a suitable number of scans can be used for image contrast refreshment.

Another object of the invention is to provide improved apparatus for recording optical images on tape electronically in black and white or in color for later read-out by electron beam scanning.

Still another object is to provide such apparatus which retrieves images stored electronically on an optoelectronic medium with an improved scanning electron beam detection system.

A further object of the invention is to provide an apparatus of the aforesaid type which achieves close control over the electron beam scan path during the retrieval or read-out operation.

Yet another object of the invention is to provide a method of acquiring and storing optical or electrical images on an optoelectronic recording medium which produces one or more of the aforesaid advantages.

Still another object of the invention is to provide a method of retrieving or reading electronic images stored on an optoelectronic recording medium that produces one or more of the benefits enumerated above.

Other objects will, in part, be obvious and will, in part, appear hereinfter.

The invention accordingly comprises the several steps and the relation of one or more of such steps with respect to each of the others, and the apparatus embodying the features of construction, combination of elements and arrangement of parts which are adapted to effect such steps, all is exemplified in the following detailed description, and the scope of the invention will be indicated in the claims.

Briefly, my new electronic microscope-camera system uses a special plural-layer, solid state, wholly inorganic, crystalline, optoelectronic recording medium. For purposes of this description, the medium will be described as a flexible tape. It should be understood, however, that the medium may also be implemented as a disk, plate or drum. The medium, e.g. tape, includes a transparent inorganic base, a photoconductive modulator on the base and a dual-material dielectric storage layer on the modulator. The tape is controllably and simultaneously electrically charged and exposed at photospeeds about 1000 times faster than all previous systems, with the charging means acting as a photographic shutter so that it acquires and stores precise electronic images in its storage layer for immediate or delayed read-out. In one apparatus embodiment, the acquired electronic images can be subsequent to the imaging step by exposure in the dark to a high energy electron cloud for the purpose of removing the initial bias electron charges from the tape. To read or retrieve the pictures stored on the tape, the tape is scanned by a finely focused electron beam and the latent images thereon are read-out in analog form and digitized. These binary picture signals, now in serial form, may be processed by conventional electronic circuitry for display or to reproduce hard copy, or they may be stored on other storage media for later use.

Thus, the present system performs unlike those prior electronic imaging systems discussed at the outset which digitize the incoming picture information immediately and, therefore, require a buffer memory for intermediate storage of an equivalent image on a magnetic medium such as video tape. That is, whereas those prior systems use the photosensitive medium many times as an acquisition element, the information must be stored elsewhere. In the system described herein, the photosensitive medium itself stores the pictures until the user wishes to retrieve those pictures in analog form for display or reproduction. As we shall see, the recording medium and the remaining elements of my system interact and cooperate optically and electronically to optimize the exposure of the recording medium under the prevailing light conditions in the instrument's field of view so that the image recorded on the tape is of the highest resolution and has many steps of grey (dynamic range) and large contrasts.

As will be seen later also, the electronic images stored on my medium are read nondestructively from the medium so that the same images can be read numerous times and, in fact, the images stored on the tape can be refreshed from time to time if multiple read-out should slightly affect the stored signal level. Thus, my system can retain high quality electronic images for a prolonged period, making it especially useful for longterm or archival storage of optical images. On the other hand, if desired, the tape can be erased fully and reused repeatedly so that the system is aplicable to short-term storage of optical signals as well.

In my recording system, a projector, which may be an optical enlarger or reducer, projects a light image onto the recording medium which is supported by a transparent platen at the focal plane of the projector. The projector optics account for the presence of the medium which has a high refractive index and the projector includes a motorized focus adjustment. The platen supporting the tape also incorporates an array of filter stripes and another array of photosensitive stripes which are flush with the tape and which respond to different light intensities over the image area by producing corresponding electrical signals. These intensity signals are used to generate a set of control signals which are applied in a feedback arrangement to adjust the projector's focus so that the image projected onto the recording medium is brought into sharp focus automatically before each picture is taken.

Every optoelectronic recording medium has a charge vs. exposure characteristic curve which is a measure of the medium's sensitivity or responsiveness to light at different exposure levels, comparable to the ASA rating of conventional silver halide photographic film. Conventional cameras and recorders utilize a separate light sensor to set the exposure to suit the film being used. In the present system, those same photosensitive stripes on the platen that are flush with the tape are used to measure the incoming light energy and contrast to set the charging current and duration for exposure so that the total incoming energy flux is placed at the optimal sensitivity region of the particular recording medium or tape being used. Therefore, there is little likelihood of the medium being overexposed or underexposed during the taking of the picture.

After the camera has been focused and its exposure set automatically as aforesaid, the picture is taken, i.e., the tape is exposed to an optical image or signal. During this exposure step, while the incoming optical image is projected onto the tape, an electron source deposits a cloud of electrons on the surface of the tape's dielectric storage layer, and at the same time the active layers of that medium are subjected to a very intense electric field caused by the electron deposition on the storage layer and a counter-potential at an electrode layer adjacent to the base. The energy in the light image focused onto the medium is absorbed in the tape's photoconductive modulator, thereby creating electron-hole pairs in that photoconductor. Under the influence of that field, the positive carriers or holes tunnel through an interface or barrier zone (field effect) comprising one component of the dual-material storage layer to the underside of the other component, namely a dielectric storage zone, while the negative charges or electrons are conducted away from the photosensitive medium via the electrode layer to the battery. The positive charges become trapped or "pinned" to the underside of the dielectric zone and as soon as the electric field is turned off, the interface layer acts as a barrier to prevent any thermally generated or image unrelated photogenerated charges from tunnelling through the interface layer and thus accidentally neutralizing the positive image-related charges which are pinned, as charge centroids, at the underside of the dielectric zone.

The number of electron-hole pairs produced at any location in the image area depends upon the amount of light impinging upon the photoconductive layer at that location, thus, translating the incident photonic energy into an electronic equivalent in the medium which is stored as a distribution of positive charges at the underside of the medium's dielectric layer. Substantially all of these positive charges are matched by an equal number of negative charges, or electrons, which reside opposite the positive charges in the surface of the dielectric layer, having been deposited there by the electron source. Thus, the tape's photoconductive modulator modulates the movement of charge carriers in the medium in accordance with the incoming light image to create a distribution of electronic domains across the upper and lower surfaces of the dielectric layer to form the electrical analog of the image which is projected onto the tape. As will be described in more detail later, the recording medium has a high degree of perfection and is very thin with the result that the charge distribution on the medium's image area forms a very accurate noise-free represntation of the optical image in the camera's field of view.

At the completion of the exposure step, the electronic images on the tape may have their charge biases removed by subjecting the surface of the storage layer to a stream of energetic electrons from an electron source. This clears the surface of the dielectric layer of all negative charges that are not bound there by corresponding positive charges reposing at the underside of the dielectric layer. The removal of those free charges eliminates directional dark currents which could form background noise. Even in those applications where the removal of excess electrons at the surface of the storage layer is not sought as noted above, with the removal of all but image-related electric fields, any thermally generated carriers in the photoconductor (dark current) cannot tunnel through the interface layer and, therefore, leave unaffected the electronic image which is stored in the dielectric zone or layer. Resultantly, an electronic image of unusually high quality is stored on the medium and will remain there for a year or more unless that image is erased intentionally or another image is recorded at that same location on the medium. It should be noted also that the "pinned charges" do not drift laterally in the dielectric zone so that the full resolution of the original image is retained in that zone.

The optoelectronic image-storing medium or tape described herein is conveniently spooled as a strip or ribbon in the recording apparatus, which may be a microscope or camera, and advanced frame by frame into the focal plane of the apparatus so that images can be recorded on successive frames of that tape. To facilitate retrieving the information on the tape, fiducial marks and timing tracks may be recorded on the tape along with the optical images to define those storage locations or frames. When information is being read from from the tape, these markings are detected and used to develop electrical signals for controlling the recorder's tape advance mechanism to reposition the frames containing the desired optical information accurately for read-out of that stored data. Such markings are also used to initialize and align the electron beam scan as will be described in detail later.

With the aid of recorded marks on the tape, the tape can be repositioned to bring a selected frame thereof into position in front of an electron gun. The gun thereupon emits a finely focused electron beam which sweeps across the surface of the tape's storage layer in a raster-type scan under the control of a scanning circuit. The impinging electrons penetrate that surface slightly and produce secondary electron emission from that layer proportional to the number of charges deposited during exposure on each element of the picture and held by the internal electric field. A collector detects the number of emitted secondary electrons at each point in the scan and produces a corresponding electrical signal which is representative of the stored image. The electron beam initially searches for the specific fiducial mark on each frame to attain a zero position for the drive scanning ciruit so that the track of the beam on the medium will follow the filter lines which were exposed onto the frame and be guided precisely during the scanning process. The picture signal produced thusly by scanning the tape can be fed to a display, or a printer, or it can be stored on a magnetic tape or disc for later use.

The present system can take pictures in black and white or in color. In the latter event, the tape is exposed through a filter array on the tape platen consisting of very fine interlaced red, green and blue color lines which coincide with the scan lines of the electron beam raster. Thus, when a picture is taken, the information stored electronically on the medium consists of three interlaced images corresponding to the red, green and blue color components of the optical image projected onto the tape. To retrieve or read that stored color image during a read-out operation, the electron beam is caused to execute three successive scans across all of the image lines of each color. Thus, the electron collector generates a set of three analog signals representing the red, green and blue color information stored electronically on the recording medium. These signals, which are in serial form, are then amplified, digitized, color corrected and otherwise processed in ways well known in the color graphics art to produce picture signals for controlling a color display or color printer. The sensitivity of the electron collector-amplifier, combined with the nearly noise-free perfection of the optoelectronic recording medium, gives my system extremely high sensitivity and fast response, equivalent to a silver halide film speed in the order of ASA 3,000.

The optoelectronic recording medium or tape that is used in this recording system can be scanned numerous times without destruction or even material degradation of the recorded information. In fact, the image stored on the medium can be refreshed from time to time with the aid of the electron source if need be to restore its original distributed charge potentials and, thus, its contrast. If, however, it is desired to record other optical images on the medium, the stored electronic images can be erased quite easily by exposing the medium briefly to ultraviolet light. This short wavelength energy renders the dielectric layer of the medium sufficiently conductive to neutralize the electronic charges stored at opposite surfaces of that layer.

When my system is implemented as a microscope or as a camera of the single lens reflex type, the medium disclosed herein is preferably made as a flexible strip or ribbon with recording frames alternating with transparent or translucent viewing frames. In the case of the microscope, the operator can look through a viewing frame at an object being examined before taking a picture of that object on the next recording frame. In the case of the camera, the field of view may be projected as a virtual image onto a viewing frame area so that it can be observed through the camera's view finder prior to taking the picture to be stored on the next recording frame. My apparatus also includes a tape transport mechanism, the required logic circuitry and battery power supply to enable the apparatus to advance the tape accurately and take pictures automatically at the touch of a button on the camera housing. As will be seen, the amount of electrical energy needed to deposit the electronic images on the recording medium and to retrieve those images is quite low so that the unit can be lightweight, compact and portable. Also, the electron-producing sections of the recorder and the recording medium are contained in an evacuated compartment in the recorder housing so that lenses and batteries can be changed in the usual way without affecting the operation of the apparatus of the medium. Therefore, my recording system should find wide application whereven the acquisition, long or short term storage and subsequent retrieval of visual information is desired.

BRIEF DESCRIPTION OF DRAWINGS

For a fuller understanding of the nature and objects of the invention, reference should be had to the following detailed description, taken in connection with the accompanying drawings, in which.

DETAILED DESCRIPTION OF THE PREFERRED EMBODIMENT

Figure 1:
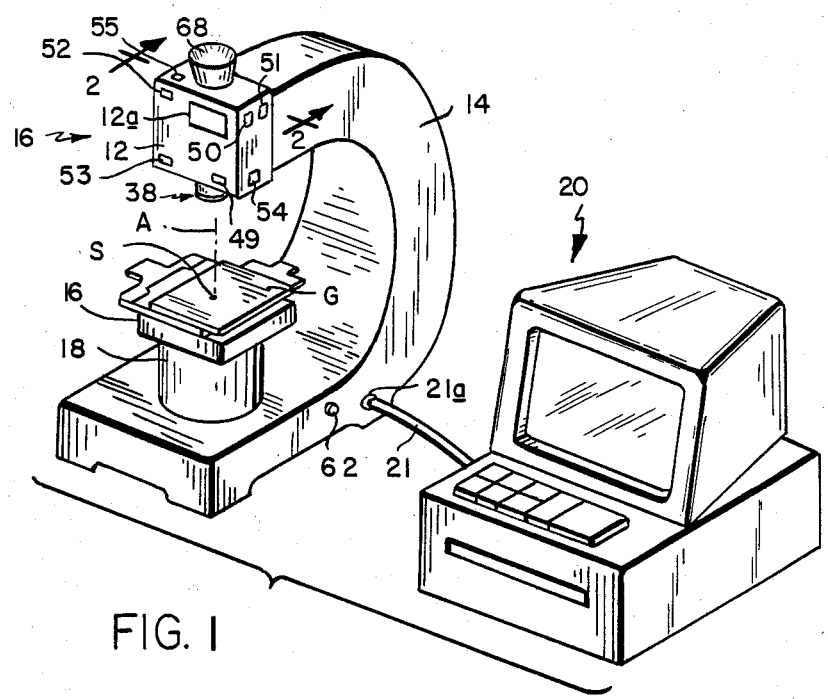
FIG. 1 is an isometric view of an interactive electronic image recording system embodying the invention implemented as a microscope.
Figure 2:
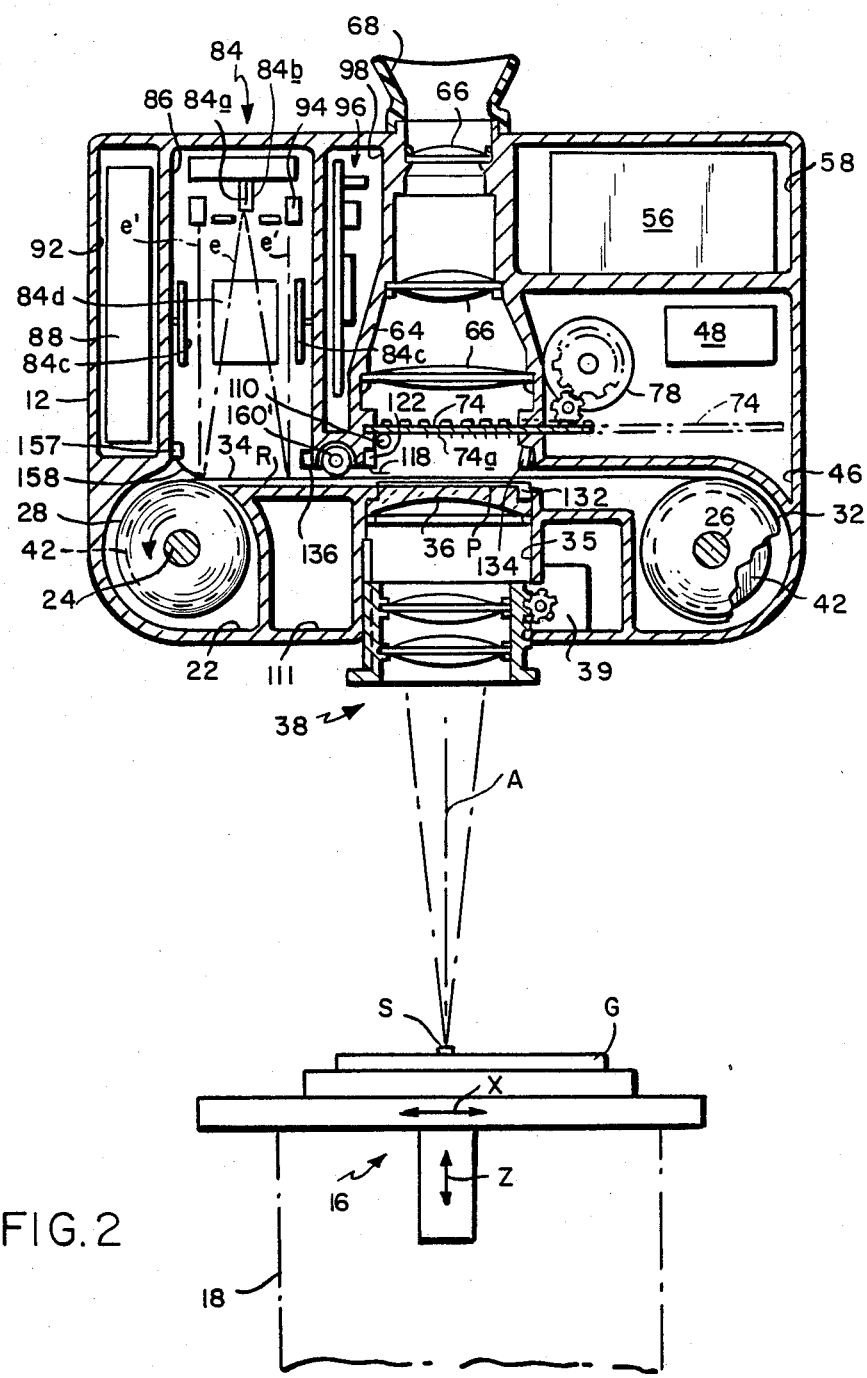
FIG. 2 is a sectional view on a larger scale taken along line 2—2 of FIG. 1.

Referring now to the drawings, FIGS. 1 and 2 show my interactive electronic image recording system. For purposes of this description, the system takes the form of a microscope-camera 10 capable of acquiring and storing electronic images of very small specimens or objects. However, the invention could just as well be implemented as a different type of recorder, such as a camera, by substituting the appropriate camera optics or lens system.

The microscope 10 comprises a rigid housing 12 which is supported by a stand 14 above a standard X-Y-Z slide table or positioner 16 mounted to a pedestal 18 projecting up from the base of the stand. The positioner 16 is arranged to support and position a glass slide G on which the specimen S to be viewed is placed. Using the positioner 16, the specimen S can be spotted on the viewing axis A of the microscope 10. After microscope-camera 12 takes a picture of specimen S, which is stored on an optoelectronic recording medium 34 (FIG. 2) inside the microscope, that apparatus can be operated in a readout mode to retrieve the stored image for display or reproduction using a CRT/printer unit indicated generally at 20 connected electrically to the microscope by a cable 21.

As best seen in FIG. 2, the microscope housing 12 is divided into a plurality of internal compartments. More particularly, there is a tape transport compartment 22 at the bottom of the housing which contains a pair of rotary spindles 24 and 26 for supporting take-up and let-off spools or reels 28 and 32, respectively, between which stretches the optoelectronic recording medium which is in the form of a long phototape 34. When the spindles 24 and 26 are rotated, the tape is advanced along a focal plane indicated generally at P which constitues the exposure position of the tape.

The bottom wall of housing 12 is formed with a generally cylindrical cavity 35 which intercepts compartment 22 directly opposite plane P. The inner end of that cavity is closed by a transparent glass platen 36 that isolates compartment 22 from cavity 35. While in FIG. 2 the platen 36 is shown separated from the tape, in actuality, its surface 36a positions the tape at focal plane P. The platen may also constitute an optical element in the microscope's optical path to produce field flattening, color correction, filtering, etc. of the incoming optical image. Furthermore, as we shall see, the platen has special light sensing capabilities that are used to focus the microscope automatically prior to taking a picture and to set the exposure duration when the picture is being taken.

The camera's movable lens unit, indicated generally at 38, is rotatively mounted in cavity 35 and the microscope is focused onto specimens by controlling a servomotor 39 that moves the lens unit axially very precisely in one direction or the other. Of course, the instrument can also be focused manually by appropriately moving unit 38.

The tape 34 is moved back and forth between the two spools 28 and 32 by reversible servomotors 42 which rotate spindles 24 and 26 respectively. By applying currents to these motors 42 of the appropriate polarities, the tape 34 may be kept taut and moved in either direction to position a selected tape frame on platen 36 at the microscope's focal plane P. In some applications, the tape may be advanced by other means such as a capstan or a linear or eddy current motor using a metallized margin of the tape itself.

The mechanism for transporting tape 34 may include other components, such as tape edge guides and a tape gate for actually locating each increment or frame of the tape at an exposure position in the image plane P. However, for ease of illustration these components, which are found in many conventional automatic cameras, have not been shown in the drawing figures.

Microscope 10 includes another compartment 46 which contains the camera's control section 48. That section includes a microprocessor and current drivers for providing the drive signals for the drive motors 42 and for the camera's gate (if present). The makeup of section 48 and the programming of its processor will be obvious from the control functions to be described. When the operator pushes a recessed FORWARD button 50 (FIG. 1) in the side wall of housing 12, the control section 48 will apply a selected number of pulses to motors 42 to shift the next tape increment or frame into the exposure position at the image plane P. Signals from control section 48 to the motors will shift the tape frame by frame in the opposite direction when a recessed REVERSE button 51 on the side of the housing 12 is depressed. Preferably, buttons 50 and 51 and the camera's other control buttons to be described are capacitive "touch" buttons built right into the wall of housing 12. These other control buttons include a FOCUS button 49 which may be depressed to automatically focus instrument 10, an EXPOSE button 52 which initiates the recording of an optical signal on the tape 34, a READ button 53 which initiates a read operation on the tape to produce picture signals corresponding to an image stored on the tape and an ERASE button 54 which is depressed to erase an image already stored on the tape in microscope-camera 10. Also, a tape frame counter 55 is mounted in the top wall of housing 12.

The power for motors 42 and for control section 48 and the other electromechanical parts of the apparatus derives from a power supply 56, including batteries, contained in a compartment 58 of housing 12 located above compartment 46. Appropriate electrical conductors are provided between these parts as wires or printed circuits inside the housing. Access to the interior of the battery compartment 58 is had by removing a small cover 12a (FIG. 1) in the front wall of housing 12. Preferably also, the batteries in the power supply 56 are of the type that can be recharged by connecting them to a source of DC power by means of a female connector 62 located at the bottom of stand 14 as shown in FIG. 1.

Housing 12 also has a large compartment 64 which is aligned with the axis of lens unit 38, which axis coincides with the optical axis A of the microscope. Compartment 64 contains the various stationary lenses 66 that comprise the microscope. These are all centered on axis A and the operator uses the microscope to observe specimen S by looking through an eyepiece 68 in the top wall of housing 12.

Still referring to FIG. 2, microscope-camera 10 also includes a field emission device or electron source 74 which is slidably mounted in the housing just above platen 36. The source can be moved between an extended position shown in solid lines in that figure wherein it overlies the tape frame at the focal plane P and a retracted position shown in dotted lines in that same figure in which the gun is located in housing compartment 46 away from the tape. While source 74 may be shifted between its two positions by any suitable means, in the illustrated apparatus, it is moved by a servomotor 78 located in compartment 46 and coupled to source 74 by way of a rack and pinion arrangement. The electron source 74 is normally located in its retracted position so that it does not obstruct the operator's view through the microscope. However, during the exposure process, the source is moved to its extended position overlying the tape by motor 78 under the control of section 48. Section 48 then causes source 74 to direct a cloud of electrons from discharge points 74a of source 74 against the upper side of the tape frame present at the focal plane P. As we shall see, the upper surface of the tape frame at plane P becomes charged with these negative carriers, enabling that frame to acquire and store an electronic image corresponding to the optical image projected onto that frame by the instrument's lens unit 38. The amount of the charge is controlled in terms of time and magnitude to assure the capture of the maximum amount of information contained in the image to be recorded. As we shall see, the electron source 74 is also used to eliminate the electrical bias field from each tape frame after the exposure of that frame by removing excess charge carriers from the frame.

Microscope-camera 10 also includes an electron gun 84 located in a large housing compartment 86 to the left of compartment 64 and used when instrument 10 is operated in its read-out mode. Unlike source 74, electron gun 84 directs a finely focused beam of electrons to the exposed tape frame present at a read plane or position R in compartment 86 that is defined by the bottom wall of that compartment. Gun 84 is controlled so that the electron beam sweeps out a raster on the upper surface of that frame by a circuit 88 located in a housing compartment 92 positioned just to the left of compartment 86. Since tape 34 is temperature dependent, preferably the gun is a cold cathode device that does not generate heat.

During read-out, the scanning electron beam from gun 84 causes secondary electrons to be emitted from the tape frame being scanned whose numerical distribution by area elements (pixels) represents the electronic image stored on that frame. These secondary electrons are collected by an annular electron collector 94 located near the top of compartment 86 which thereupon produces a signal which is the electrical analog of the stored image. That signal is applied to a read-out circuit 96 contained in a housing compartment 98 to the right of compartment 86 where it is amplified, digitized and otherwise conditioned before being applied to the various conductors of the connector 21a to which cable 21 is coupled as shown in FIG. 1. Those picture signals are then fed by way of that cable to terminal 20 where the retrieved image can be viewed or reproduced.

In the microscope-camera 10 specifically illustrated herein, the same tape 34 is intended to remain permanently in the housing compartment 22. Accordingly, that compartment, along with compartments 46, 86 and the portion of compartment 64 below the lowest lens 66, is maintained under a high vacuum, in the order of $10^{-8}$ Torr. To hold the vacuum, airtight seals (not shown) are provided between platen 36 and the wall of cavity 35 and between the lowest lens 66 and the wall of compartment 64. These compartments are thus free of dust, moisture and other contaminants that could interfere with the electrons from the electron sources 74 and 84.

Figure 3:
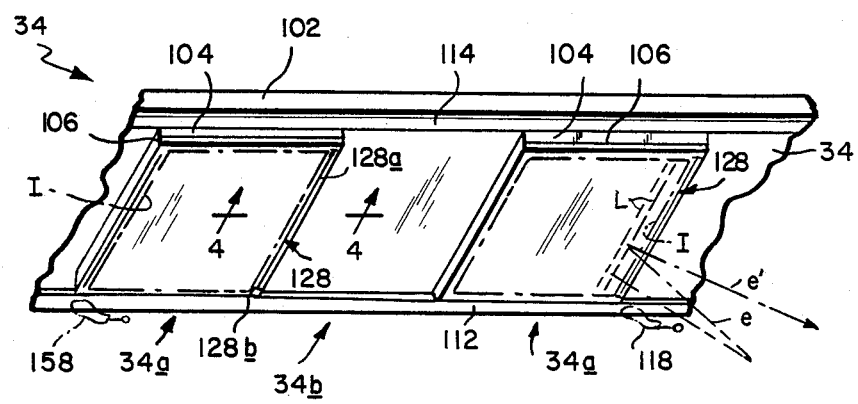
FIG. 3 is a fragmentary isometric view on a still larger scale showing the recording medium or tape used in the FIG. 1 system.
Figure 4:
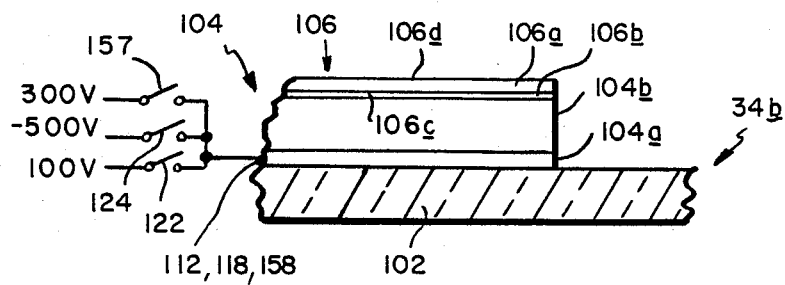
FIG. 4 is a sectional view on an even larger scale taken along line 4—4 of FIG. 3.

Refer now to FIGS. 3 and 4 which show the optoelectronic tape 34 in greater detail. It is composed of a large number of imaging segments or frames 34a and an equal number of viewing segments or frames 34b which alternate along the length of the tape. The tape is made in toto of inorganic materials, as opposed to organic plastic materials. Therefore, it does not produce dreaded contamination caused by outgassing in the high vacuum environment of the microscope and it will, therefore, not produce any adverse effects on the electrons emmitted from guns 74 and 84.

Basically, the tape is a unitary hetero-epitaxially grown structure comprising a flexible, optically clear (from 0.2 to 5.0 micrometers) ribbon-like monocrystalline sapphire ($Al_2O_3$) base or substrate 102. Added to base 102 in each imaging area 34a of the strip are a thin (i.e., about 10,000 Å) modulator 104 composed of a photoconductive material, such as silicon (Si) or gallium arsenide (GaAs), and a very thin (i.e., 1,000 Å) dual-material storage layer 106. A very thin phosphorus-doped zone 104a of modulator 104 (i.e., n-doped with fixed positive charges) is present adjacent base 102 to serve as an electrode. The remaining zone 104b of modulator 104 is free of additives.

The dual-material storage layer 106 is composed of a very thin (i.e., about 1,000 Å) storage zone or layer 106a made of a suitable dielectric material such as silicon nitride ($Si_3N_4$) and an ultra- thin (i.e., about 30 Å) interfacial zone 106b of an anisotropic dielectric material such as silicon dioxide ($SiO_2$) at the underside of zone 106a. Zone 106b exhibits electrical insulating behavior that prevents penetration of thermally generated or even photogenerated charge carriers in modulator 104 to the undersurface of storage zone 106a; but zone 106b does allow tunnelling through to the storage zone 106a of photogenerated charge carriers under the influence of a suitable superimposed strong orthogonal electrical field through the tape layers 104a, 104b, 106b and 106a. In other words, charge carriers from the modulator 104 that have tunnelled through zone 106b under the influence of an applied field are "pinned" to the underside 106c of storage zone 106a in so-called charge centroids. In the absence of that field, zone 106b prevents additional carriers from reaching the storage zone and disturbing the properly accumulated charge count there. Thus, zone 106b traps all photogenerated positive carriers created during the exposure step in storage zone 106a, thereby storing an electronic signal pattern spatially in that zone of the tape and preventing also any lateral movements of said charge carriers in zone 106a so that an image having exceptional resolution is maintained for many years.

The tape 34 is very thin, being only a few microns thick, so that it is flexible enough to be wound easily onto reels 28 and 32. It may be made, for example, by the process described in applicant's copending patent application of even date herewith entitled Method and Apparatus For Making Inorganic Webs and Structures Formed Thereof, which disclosure is incorporated by reference herein. The imaging areas 34a of the tape have extraordinary properties, among which are extremely high sensitivity or photospeed, comparible to a silver halide film speed in the order of ASA 3,000. Each of these areas is imageable at low energy levels (e.g. 20 electrons minimum/pixel) due to low inherent noise (defects) and dark currents (threshold minimums). Thus, each of the areas has the capacity to acquire a very high quality electronic image corresponding to the optical image projected onto it by the microscope's lens unit 38. Furthermore, because of the barrier and trapping functions of the tape's unique dual-material storage layer 106, an image can be stored on the tape areas 34a for several years without any appreciable degradation of that image.

The images stored on the tape frames 34a can be read by scanning the surfaces 106d of those areas using the electron beam from gun 84 to produce exceptionally high guality displays or reproductions of the stored images. If desired, the image on each tape frame 34a can be erased by exposing the frame to ultraviolet light from a U.V. lamp 110 (FIG. 2) mounted in housing compartment 64 just above tape 34. This radiation discharges the frame's dielectric layer 106 enabling the film frame to be reused repeatedly and the frame area does not lose its optical signal acquisition and storage capabilities with such repeated usage.

The base or substrate 102 of tape 34 is quite transparent so that the segments of that substrate in the viewing frames 34b of the tape constitute windows. When one of these frames is located at the microscope's focal plane P, the operator sighting through eyepiece 68 can see right through that frame to the object being viewed, i.e., specimen S (FIG. 1).

In another application, as when the tape 34 is processed in a single lens reflex camera incorporating my invention, the surface of the substrate 102 may be abraded, etched or otherwise treated in the tape frames 34b so that it has the characteristics of frosted glass. If the modulator 104 and storage layer 106 are etched away to form the viewing frames, then only the clear sapphire substrate remains in the optical path for viewing the scenery as through a telescope; however, the refractive index of the substrate must be considered when the additional lens elements are calculated for the viewfinder subsystem. In any event, a virtual image of the scene in the camera's field of view will be projected onto the viewing frame located at the camera's focal plane and that image can be seen from behind the frame by looking through the camera's viewfinder eyepiece. It should be noted that the red, green, and blue filter lines, which represent the primary colors, will appear as white to the viewer (daylight spectrum). Also, of course, the phototape may consist entirely of imaging frames for use with an instrument having a seperate viewfinder.

Referring to FIG. 3, proper exposure of the imaging frames 34a of the tape requires that voltages from power supply 56 be applied to the conductive zone 104a at those frames. Accordingly, in the forward edge margin of each imaging area, the material zones 106a, 106b, and 104a to 104b are etched away so that a conductive strip 112 can be laid down on conductive zone 104a. If desired, in some applications the strip 112 adjacent each frame 34a may be isolated electrically from the similar strips associated with the other frames of tape 34 so that electrical connections may be made to each frame independently. As shown in FIGS. 2 and 3, when a particular imaging frame 34a is present at the microscope's focal plane P, a contact finger 118 at the front of compartment 64 contacts strip 112. As shown in FIGS. 2 and 4, that contact finger is connected in parallel to switches 122 and 124 in the microscope's control section 48. Alternatively, electrical connections to the strip may be made through the spool spindle 24 or 26.

As best seen in FIG. 2, an optical detector 134 connected to control section 48 is located at the righthand corner of compartment 64 above the tape. It is arranged to detect the transition from a transparent viewing frame 34b to the next opaque imaging frame 34a, i.e., the leading edge of an imaging frame. Whenever section 48 receives a detector 134 signal, it indicates that a viewing frame is positioned properly at focal plane P. That signal also indicates that the previous imaging frame 34a (or the tape leader) is located at the readout plane R in compartment 86 for a read operation on that frame by electron gun 84. A second similar optical detector 136 is positioned just above the tape on the righthand wall of compartment 86. Detector 136 emits a signal to section 48 whenever it detects the leading edge of a frame 34a, thus indicating that a frame 34a is positioned properly at focal plane P, ready for imaging. Thus, the detectors 134 and 136 together provide position signals to section 48 enabling that section to control servomotors 42 to position a tape frame 34a or 34b at either the exposure position at focal plane P or the scanning or readout position at readout plane R.

Figure 5:
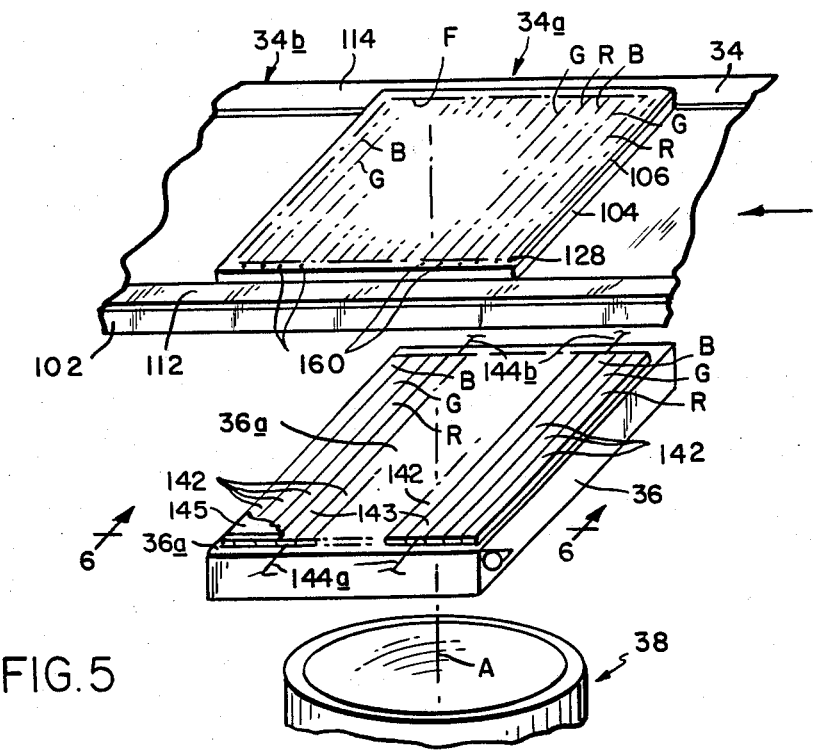
FIG. 5 is a view similar to FIG. 3 showing a portion of the FIGS. 1 and 2 system in greater detail.
Figure 6:
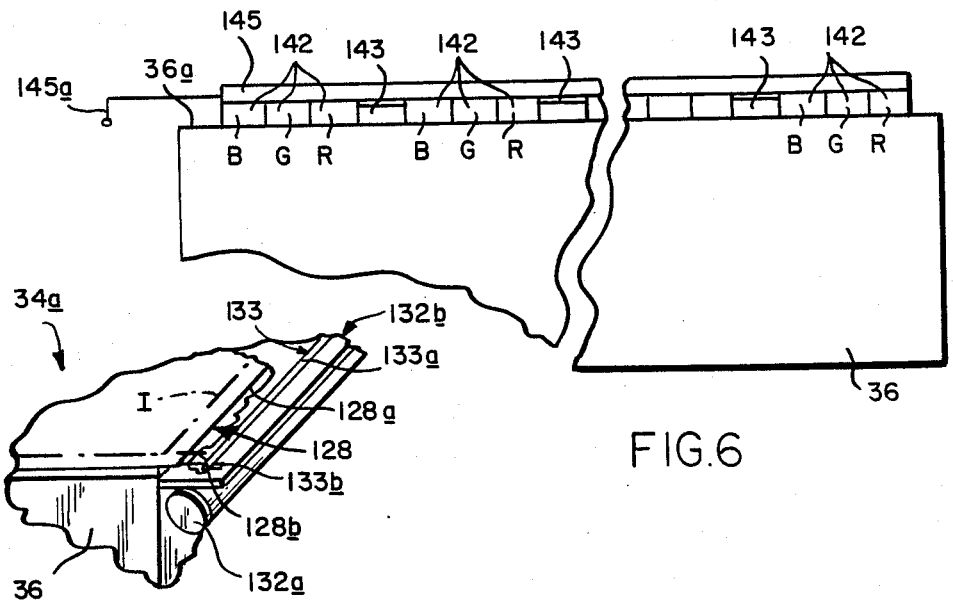
FIG. 6 is a sectional view taken along line 6—6 of FIG. 5.

Refer now to FIGS. 5 and 6 of the drawings which depict the portions of microscope-camera 10 that set automatically the instrument's focus and its exposure in accordance with the prevailing lighting conditions. These parts include an array of numerous thin, parallel, transparent, abutting, bandwidth-limited, electrically insulating, color filter stripes 142 formed on the platen surface 36a that supports the tape 34 at the camera's focal plane P. The stripes extend longitudinally and parallel with respect to the tape edge so that they coincide with the scan line pattern associated with the electron beam from gun 84. Although the drawing figures illustrate stripes 142 as being relatively thick and few in number, in actuality there may be several thousand stripes in the array on platen 36, each stripe being in the order of only a few microns wide and a few microns thick.

The filter stripes 142 on platen 36 consist of very fine abutting parallel red (R), green (G), and blue (B) films which divide the incoming light image into its color components. Thus, when a tape frame 34a is exposed at plane P, the image applied to the frame consists of red, green and blue color components of the object being viewed which are interlaced on the frame as shown. In other words, the picture information for each color component of the picture is stored every third line on the tape frame. The color filter lines coincide with the raster path of the scanning electron beam from gun 84, when that imaging frame is located at read-out plane R in compartment 86. The width of the scanning electron beam may be slightly less than the width of the filter stripes to compensate for any residual skew and any minute misregistration of the tape frame 34a between its exposure position at plane P and its read-out at plane R.

Interspersed with the stripes 142 are a series of thin, photoconductive stripes 143 featuring large band width sensitivity. The function of stripes 143 is to detect incident light levels when their photo-currents are all integrated and image contrast (focus) when their differential photo-currents attain the widest amplitude spread. Suitable photoconductive materials for stripes 143 include silicon or gallium arsenide (GaAs). Electrical leads 144a and 144b lead from the conductive layers of each stripe 143 to the camera's control section 48. The number of photoconductive stripes 143 may be only 10 or 100 out of the several thousand filter stripes 142, placed at ninety line intervals, for example. When a voltage is applied across each stripe 143, the current through that stripe will provide a measure of the intensity of the light incident on that stripe. The photodetector stripes 143 are quite opaque as compared to the color filter stripes whose transparency exceeds 90% in the bandwidth limited region but, since they are relatively few in number, they attenuate the incident light only minimally.

Preferably, a transparent conductive film or layer 145 overlies stripes 142 and 143, clearing the latter as shown in FIG. 6, to form an electrode which is connected by a lead 145a to control section 48. During the exposure process, control section 48 biases layer 145 negative with respect to the tape conductive layer so that that frame is electrostatically attracted to platen 36 and held closely to the filter stripes 142. On the other hand, when the tape is being moved before and after exposure, section 48 applies a DC voltage of the opposite polarity to layer 145 so that the tape is electrostatically repelled from the platen 36 to minimize scratching of the tape base 102.

When the operator depresses the EXPOSE button 52 (FIG. 1) to record an optical signal on a tape frame 34a just prior to exposure of that frame, control section 48 connects stripes 142 to the power supply 56 so that a constant voltage is applied in parallel across all of the photosensitive stripes 143. The control section then samples and integrates the currents through the stripes to develop a total flux (TF) signal which represents the total light flux incident on the tape frame 34a being exposed. That TF signal is then used by control section 48 to control the charging current flowing during the separately computed on-time of the electron source 74 during the exposure process; the control section also "finds" the stripe producing the smallest signal, representing the darkest part of the image, the magnitude of that signal, referred to herein as the exposure duration (ED) signal, being used by section 48 to control the "on time" of the electron source 74 during the exposure process, the mathematical product of current and "on time" being proportional to the incident light flux.

Figure 7:
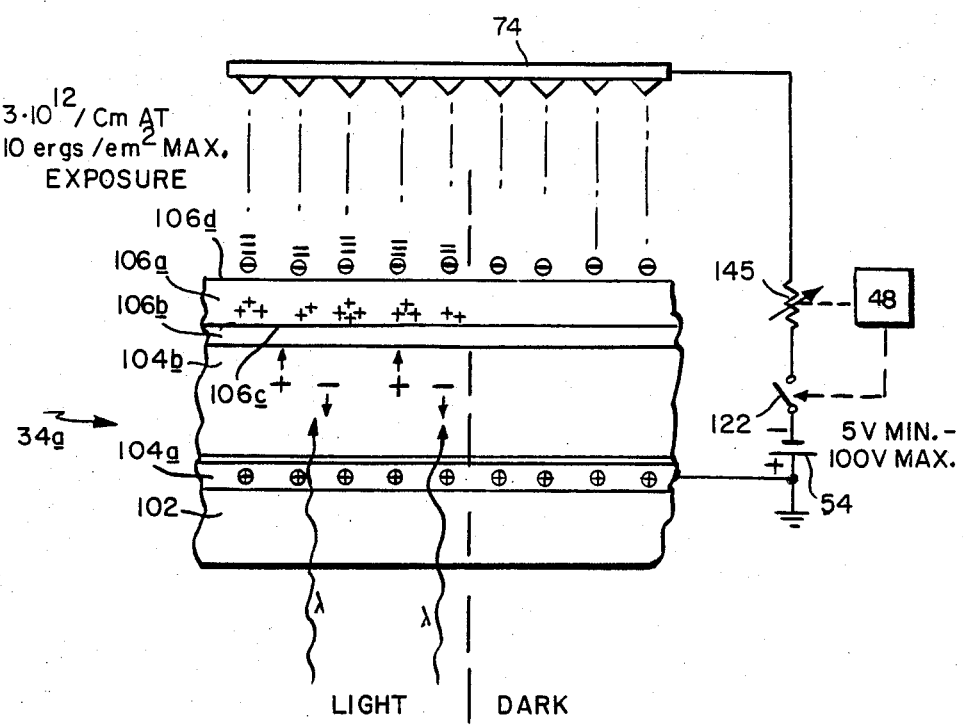
FIG. 7 is a diagrammatic view illustrating the exposure of the FIG. 3 medium.
Figure 8:
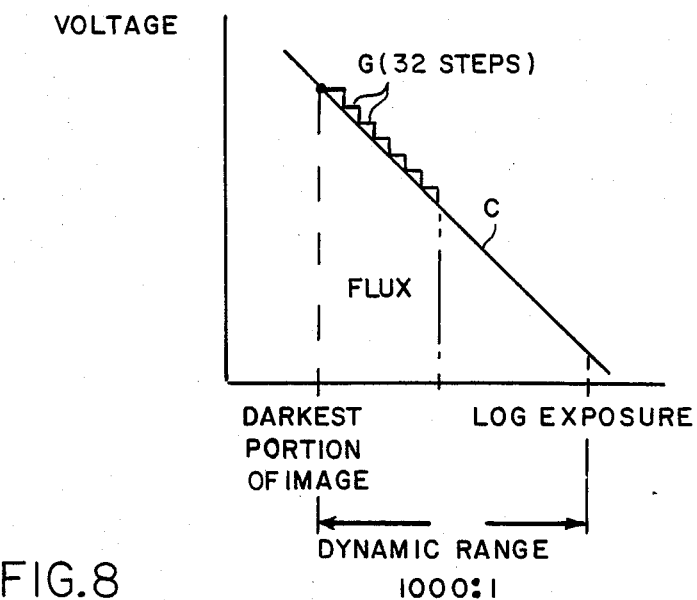
FIG. 8 is a graph showing the mode of controlling exposure.

Refer now to FIG. 7 which shows the electrical environment of the film frame 34a during exposure and FIG. 8 which depicts a typical characteristic curve C for the frame being exposed. Effectively, control section 48 controls a variable resistor 145 connected in series with electron source 74, a 5–100 volt tap of power supply 56, switch 122 and tape imaging frame 34a at layer 104a thereof so that the darkest part of the light image being projected onto the frame receives a selected minimum exposure, i.e., at least $10^9$ photons/cm$^2$ corresponding $10^{-3}$ ergs/cm$^2$. In a typical case, the charging current in the FIG. 7 circuit is under one ampere and persists for one microsecond to one second (or more), depending upon the amount of light incident on the tape. Each incident photon produces one electron-hole pair in modulator layer 104 as shown in FIG. 7. In the portions of modulator 104 where the light image is darkest, the incident photons emanating from a faint image typically produce in the order of $3 \cdot 10^8$ electrons/cm². For the brightest parts of the modulator, there may be in the order of $3 \cdot 10^{11}$ photogenerated electrons/cm². Thus, the charges stored at different locations on layer 106 may vary from, say, 20 electrons/pixel to $20 \cdot 10^3$ electrons/pixel. The difference yields a dynamic range of 1000:1, permitting the retrieval of far more than the desired thirty two different grey levels G in the image being recorded on the tape frame 34a, as shown in FIG. 8.

The electric field across the tape causes the photogenerated electrons to move toward conductive layers 104a from where they are conducted away to the ground plate of the battery 56 via conductive layer 104a. The photogenerated positive carriers or holes move toward tape storage layer 106. Under the influence of the strong superimposed external field extending between the electrode layer 104a and the virtual electrode formed by electron deposition on surface 106d and the additional internal field formed between negative electronic charges on the surface 106d of layer 106 and the innate positive potential of the holes, these holes tunnel through the interfacial zone 106b and are trapped in the undersurface 106c of the dielectric zone 106a in numbers that are in direct proportion to the image brightness in the different parts of the image area I of the frame 34a. These positive charges are balanced by equal numbers of electrons from source 74 that repose on the surface 106d of layer 106 as shown in FIG. 7. Although the charge domains or numbers of electrons stored at adjacent pixels on tape surface 106d may vary to establish the contrast or grey levels in the stored electronic images, the potential versus electrical ground is equalized throughout the frame area. Thus, during exposure, control section 48 charges frame 34a to a voltage and for a time so as to operate on the optimum segment of the tape's characteristic curve C (FIG. 8) under the prevailing lighting conditions. Accordingly, there is no possibility of over-exposure or under-exposure of the picture being taken by camera 10 and stored on each tape frame 34a in an exposure energy range from a minimun of $10^{-3}$ ergs/cm² to 10 ergs/cm².

As noted above, the photosensitive stripes are also used to focus the camera when a viewing frame 34b is located in the focal plane P. Accordingly, the specimen S (FIG. 2) will assuredly be in focus when seen through eyepiece 68 and frame 34b or when photographed on the next imaging frame of the tape. More particularly, when control section 48 receives a signal from detector 134 indicating that a viewing frame 34b is positioned at focal plane P, it provides a constant voltage across stripes 143 and samples the current signals from these stripes as described above. When an out-of-focus image is projected onto the array of stripes which, in fact, defines the camera's focal plane P, that image will be blurred and will have little or no gray level differentiation or contrast over the image area in plane P. Accordingly, the output signals from the array of stripes 143 will have a corresponding lack of differentiation. As the projected image at plane P is brought into focus, there is greater contrast between light and dark areas of the projected image. Ultimately, when the image projected onto the stripe array is in exact focus, the differences between the lighter and darker areas of the image will reach a maximum, as will the amplitude spread of the differential photo currents from the stripes 143 corresponding to those image areas.

During the focusing process, control section 48 repeatedly samples the set of signals produced by the stripe array. During each such sampling, after being digitized, the signals from the stripes are subtrated to develop a set of difference signals which are averaged and inverted to produce a feedback signal to control the motor 39 that moves lens unit 38. If, as a result of a given sampling, the motor 39 is driven to improve the focus, the feedback or difference signal resulting from the subsequent sampling of the stripe signals will reflect that fact and the driving of the motor 39 will continue until the feedback signal is reduced to zero. On the other hand, if there is no improvement in the focus after a few samplings and consequent lessening of the feedback signal, indicating that the lens unit 38 is being moved in the wrong direction to achieve focus, control section 48 will reverse the polarity of the voltage applied to motor 39 so that during subsequent samplings of the stripe 143 array, the resultant feedback signal will cause motor 39 to move unit 38 in the right direction to focus the microscope-camera 10.

The automatic focus procedure described above is initiated just prior to exposure by control section 48 following depression of EXPOSE button 52. It can also be initiated by depressing the FOCUS button 49 on housing 12 if a specimen is to be viewed without being recorded.

It is generally desirable to make the focusing stripes 143 wavy, instead of straight, as shown. This avoids periodicity problems that could occur if the object being focussed upon is composed of alternate light and dark bands extending parallel to straight stripes 143, e.g., a picket fence. Also, if the present invention is incorporated into a single lens reflex camera, the photosensitive stripes 143 need only be present in a small area at the center of the platen 36 which may be marked by a border. When taking a picture, the camera is aimed so as to center that border on the point of most interest in the field of view. In this way, the focus and exposure settings will be determined by the distance and lighting conditions at that location.

In describing the operation of microscope-camera 10, we will assume that the operator has pressed the FORWARD button 50 to advance the tape 34 while it is being repelled from platen 36 as discussed above until detector 134 signals the presence of the first viewing frame at focal plane P. Upon receipt of that detector signal, control section 48 stops drive motors 42 and closes the tape gate (if present) thereby locking the first viewing frame 36b at the focal plane P.

The control section also initiates the focus routine described above by sampling the signals from the array of stripes 143 on platen 36 until the instrument is brought into exact focus on the desired object in the field of view, i.e. specimen S. At this stage, the electron source 74 is in its retracted dotted line position in FIG. 2 so that the operator can examine specimen S by looking through the eyepiece 68. The instrument is also now ready to store a picture of specimen S on the first imaging frame 34a of the tape 34 if the operator wants to do this. In that event, he depresses the EXPOSE button 52 on the camera housing which prompts the control section 48 to issue a series of command signals that control the various operative parts of the camera. More particularly, section 48 energizes and samples the signals from stripes 143 to develop and store TF and ED signals as described above. From the TF signals, section 48 computes the adjustment for resistor 145 to bias the tape to establish the requisite exposure field strength in the tape for the exposure duration called for by the ED signal. In other words it customizes the charging and duration to the prevailing lighting conditions and the range of densities of the object being viewed. Then, section 48 applies a drive signal to motor 78 causing the motor to extend the electron source 74 to its solid line position in FIG. 2 wherein it overlies the focal plane P and blocks light entering the microscope through eyepiece 68. Section 48 also applies drive signals to servomotors 42 to advance the tape, which advancement continues until the leading edge of the first imaging frame 34a is detected by detector 136.

Control section 48 responds to the detection signal from detector 136 by deenergizing motors 42 to stop the tape advance and by closing the tape gate (if present). That section also charges film layer 145 on plate 36 so that the imaging frame 34a is now positioned at focal plane P and held against the platen 36. That detector signal also prompts control section 48 to advance the frame counter 55 so that it shows the numeral "1". After section 48 receives acknowledgements indicating that all of the above operations have been completed, it energizes electron source 74 with power from power supply 56, adjusts resistor 145 (FIG. 7) and closes switch 122 for the duration of the ED signal thereby grounding by way of contact 118 and strip 112 the conductive layer 104a of the tape frame at plane P. This applies at the beginning of the exposure no less than 5 volts across the frame to facilitate tunnelling of photogenerated charges through zone 106b. It also causes a cloud of electrons to decend toward, and uniformly charge, the exposed upper surface 106d of the film frame at plane P, while at the same time that frame receives imaging photons through the lens unit 38. Resultantly, as described above in connection with FIGS. 7 and 8, a strong electric field is developed in zone 106b so that positive carriers tunnel through that zone and become pinned or trapped in zone 106a, approximately 100 Å into that zone. Further, controlled by the value of the TF signal, source 74 disperses a specific amount of negative charges during the exposure duration to equal the maximum number of photogenerated charges which have tunnelled through zone 106b, thereby establishing a charge eguilibrium in the storage zone 106a. Accordingly, a perfectly exposed electronic equivalent image corresponding to the photonic image projected onto focal plane P is acquired by that tape frame and stored in its storage layer 106.

As described above, the electronic image is present on layer 106 as a topographical distribution of different-charge coulombic domains over the area I of the tape frame 34a. This distribution is composed of two parts, namely the charges which were deposited on layer 106 at the beginning of the exposure step to establish the initial internal field between the surface 106d of layer 106 and electrode layer 104a, plus the photogenerated charges created by exposure of the tape frame. Thus, the number of electrons at each point on the surface 106d equals the number deposited initially (circled in FIG. 7) plus a number of electrons corresponding to the number of photogenerated positive charge carriers that tunnelled through zone 106b during the exposure step (uncircled in FIG. 7). In the normal mode of operation, the initial charge (circled in FIG. 7) remains on the tape frame 34a after the exposure step is completed, i.e., after electron source 74 is shut off and switch 122 is opened. Thus, the charges on zone 106a are spatially varied by the number of photogenerated carriers which became superimposed on the evenly distributed carriers present in thermal equilibrium initially. However, at each point on the frame 34a, the numbers of opposed positive and negative charges are substantially equal.

After the exposure step, when source 74 is turned off and switch 122 is open, thereby removing the negative bias that was set to control electron cloud current density and duration, the positive charges which tunnelled through zone 106b are pinned in place in zone 106a, the retention time ($t_r$) being determined by the decay of the space charge layer near the interface layer 106b, as follows:

$$t_r \approx \ln 2 / [v \exp(g\phi_B/kT)]$$

where $v$ is the dielectric relaxation frequency.

It should be noted that any free thermally generated or even photogenerated positive carriers now have insufficient energy ($kT/q = 26$ MeV) to tunnel through the zone 106b barrier ($q\phi_B = 1.7$ V) and upset the stored charge count at the underside 106c of zone 106a. If there are still any excess negative charges on the surface 106d of zone 106a, i.e., electrons with no opposed positive carriers at the underside of zone 106a, these may be removed by means of a grounded conductive roller 160' (FIG. 2) rotatively mounted in the bottom wall of camera compartment 88 and touching the surface of zone 106a as the tape is advanced automatically to its next frame position. It should be noted that those electrons representing the image remain unaffected as the conductive roller passes over frame 34a.

Simultaneous with the recording of the picture on each tape frame as just described, an electronic fiducial mark 128 is recorded in the top (i.e. right hand) edge margin of that frame outside the image area I thereof as shown in FIG. 3. As will be described later, these marks 128, recorded at the same times as the images, enable the microscope-camera 10 prior to each read-out operation, to set the initial position (zero) and skew of the scanning beam from electron gun 84 to compensate for any slight mispositioning of each tape frame 34a at its position at plane R when an image is read from the frame with respect to its position at plane P when that image was recorded on that frame. Microscope-camera 10 records these marks 128 on the tape by means of a light unit 132 located in platen 36 at the righthand corner of compartment 64 at focal plane P.

Figure 3A:
FIG. 3A is a similar view showing a portion of the FIG. 1 system in greater detail.

As best seen in FIG. 3A, unit 132 comprises an elongated light source 132a such as a LED or laser diode extending transverse to the tape 34 and which preferably emits green (e.g. $\lambda = 500$ nm) light. The other component of unit is an opaque mask 132b positioned to be in intimate contact with the tape in plane P. The mask has a precise narrow (e.g. 1 micrometer) elongated (e.g. 10 mm) slit leg 133a extending transverse to the tape (i.e. X axis) with a (Y axis) cross-slit 133b adjacent the forward edge of platen 36. Each time an optical image is impressed on the image area I of a tape frame 34a, control section 48 energizes light source 132a so that the marginal area of tape frame 32a opposite slits 133a and 133b receives a saturating dose of light. Resultantly an easily detectable electrostatic fiducial mark 128 having orthogonal cross-hair lines or legs 128a and 128b and consisting of a large number of electrons is recorded on the tape frame outside its image area I.

Figure 9:
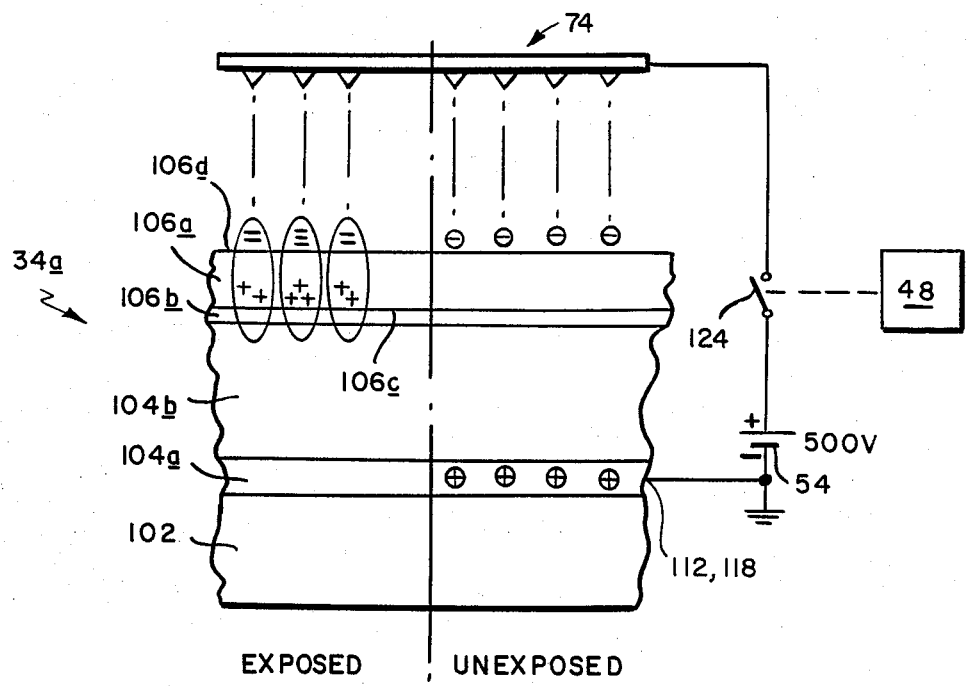
FIG. 9 is a view similar to FIG. 7 which helps to explain the passivation of the FIG. 3 medium.
Figure 10:
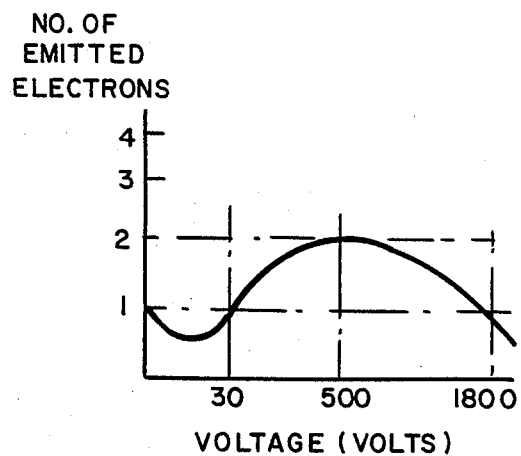
FIG. 10 is a graphical diagram that helps to explain that passivation.
Figure 11:
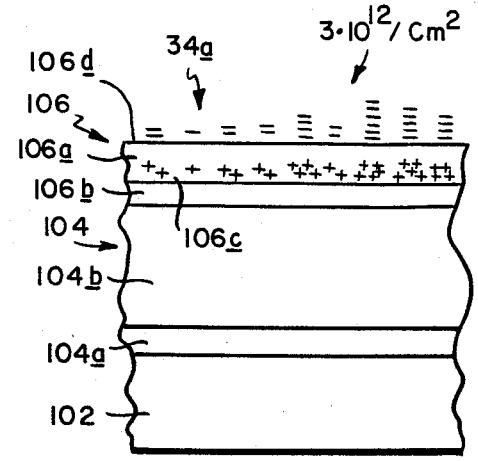
FIG. 11 is a view similar to FIGS. 7 and 9 showing the electronic image stored on the FIG. 3 medium.

In special cases, such as slow light level exposure, it may be desirable to eliminate the electrical bias field applied to the tape frame through the removal of the charges deposited initially on the frame. This step, if used, involves the operation of the electron source 74 in circuit with the tape so that each primary electron from source 74 results in the emission of more than one secondary electron from the surface 106d of tape layer 106. This gradually turns that surface electrically neutral or positive with respect to electrode layer 104a. Referring now to FIGS. 3 and 9, the bias removal of frame 34a is initiated automatically by control section 48 immediately following the exposure step while frame 34a is still in the darkness of compartment 64. Section 48 closes switch 124 momentarily (e.g. for 1/10 microsecond) so that a negative voltage in the order of 500 V from power supply 56 is applied to the strip 112 and conductive layer 104a of that frame by way of contact 118 in compartment 64. Simultaneously, section 48 turns on electron source 74, still overlying that frame, which directs a flood of energetic electrons to the surface 106d of storage zone 106a causing the emission of secondary electrons from that surface. As shown in FIG. 10, at that applied voltage, the number of secondary electrons emitted from zone 106a exceeds the number of arriving primary electrons from source 74. Once the electrons are removed from the darkest parts of the image areas (i.e., those circled electrons deposited initially at the beginning of the exposure step), only the uncircled electrons remain which counterbalance the positive charges pinned to the underside of zone 106a. Thus, as shown in FIG. 11, only the charges corresponding to the image remain on the frame. In response to incident light varying from $6 \cdot 10$ photons/$cm^2$ to $6 \cdot 10^9$ photons/$cm^2$, a typical electronic image as in FIG. 11 might vary from 20 electrons/pixel to 20,000 electrons/pixel, corresponding to a field strength of 70 V/cm to $70 \cdot 10^3$ V/cm inside the storage zone 106a. The net result is that in the unexposed or dark portions of the frame, the originally applied $3 \cdot 10^{11}$ electron/$cm^2$ blanket charge is removed so that the stored image is completely free of this bias. The surface charge in the exposed portions of the frame also drops to the exact same extent, but now reflects only the image information.

The magnitude of the dark current in modulator 104 during exposure and bias removal is temperature dependent and relatively small in comparison to the charges created during exposure. However, if temperature compensation is desired, a temperature sensor (not shown) may be incorporated into microscope 10 and coupled to control system 48 so that the duration of the exposure and bias removal steps may be varied to compensate for those changes.

Immediately following the exposure step, control section 48 issues another series of command signals. These signals open the tape gate (if present) and actuate drive motors 42 to advance the tape 34 to position the exposed imaging frame 34a at the read-out plane R in compartment 86 the and next viewing frame 34b at the focal plane P. Another command signal drives motor 78 to retract electron source 74 into compartment 46. The arrival of the just-exposed imaging frame 34a at the read-out plane R is signalled by detector 134 when it detects the leading edge of the next imaging frame. The resultant signal from detector 136 prompts control section 48 to stop the film advance.

The operator can now look at another specimen through eyepiece 68. If that specimen is out of focus, he can correct that situation without taking a picture by depressing the FOCUS button 49 which causes control section 48 to initiate the focus routine described above or he can resort to a manual focus override. On the other hand, if he wishes to photograph the new specimen, he can depress the EXPOSE button 52 again to initiate the sequence of operations just described to take a second picture which will then be stored on the second imaging frame 34a of the tape with the frame counter 55 being incremented to show a "2". In a similar manner, electronic images can be recorded in sequence on the remaining imaging frames 34a of the tape by repeatedly pressing EXPOSE button 52. After each such exposure, the next viewing frame 34b is moved to the focal plane P and the frame counter 55 will have been incremented by one. The tape 34 has typically several hundred or more sets of viewing and imaging frames so that a large number of images can be stored on a single tape.

Also, if the operator wishes, he may skip frames if he chooses to do so. For this, he presses the FORWARD button 50 repeatedly causing control section 48 to actuate drive motors 42 to repeatedly step the tape to place succeeding viewing frames 34b at plane P and to increment the counter 55 until the counter displays the desired frame number. The operator can now view beforehand, and then take a picture of, a new specimen which will be deposited on the next imaging frame 34a. The skipped frames can then be returned to and used later by depressing the REVERSE button 51. This causes control section 48 to actuate the drive motors 42 to step the tape backwards and to decrement counter 55 until the desired frame number is displayed by the counter, at which point the viewing frame 34b corresponding to that number will be positioned at focal plane P.

If when a desired frame number is reached, that frame now present in compartment 64, contains a previously recorded image that is no longer wanted, the operator would depress the ERASE button 54. This causes the control section 48 to energize momentarily the UV lamp 110 in compartment 64 so that the entire film frame at focal plane P is bathed in ultraviolet light. Electromagnetic energy of this frequency makes layer 106 conductive so that the charge distribution stored thereon is neutralized. Such UV radiation will totally erase the image on the frame; it will not, however, alter or otherwise degrade in the least the image acquisition and storage capabilities of that frame.

The mechanisms and control circuitry for moving a tape forward and in reverse to a particular frame is well known in the video tape art and, therefore, need not be detailed here. Indeed, instrument 10 may include a key pad and related circuitry to enable the operator to call up a particular frame simply by punching in the frame number or address on the pad as is done with some video tape systems.

When the operator desires to read for display or hard copy reproduction purposes the imae stored at a particular numbered imaging frame on the tape, he may step the tape forward or in reverse without exposing the tape by depressing button 50 or 51. As each frame 34a moves past detector 136, the resultant detector signal causes control section 48 to increment or decrement the frame counter 55. When the selected frame number is displayed by the frame counter, the imaging frame 34a corresponding to that number is positioned at the focal plane P. The operator may then depress the READ button 53 which will cause control section 48 to advance the tape one frame to place that selected frame at the read-out plane R in the darkness of compartment 86. Then section 48 automatically executes a read-out routine.

For this, it first it energizes the electron gun 84 and its beam control circuit 88 in housing compartment 92 from power supply 56 or from a remote power source via connector 62 (FIG. 1). Then, as best seen in FIGS. 2-4, it closes a switch 157 which connects a contact 158 in compartment 86 (and thus film layer 104a) in a high voltage DC circuit with gun 84 and power supply 56. In this circuit, the gun cathode receives a voltage of about −2 KV, while collector 94 is at ground potential and film layer 104b is held at a bias voltage of about 300 V. Resultantly, as shown in FIG. 2, electron gun 84, and more particularly its emission electrode 84a, located in an enclosure 84b, emits a small diameter (i.e., 2 micrometer) electron beam which impinges the selected imaging frame 34a at read plane R. Cold cathode electron emission sources 84 which can be operated with very little power (about 1 nonoampere) are known in the art.

As best seen in FIG. 2, on its way to the tape frame at read-out plane R, the focused electron beam e from electrode 84a passes between the vertical and horizontal deflection plates 84c and 84d of gun 84. Normaly, a controlled voltage is applied to each set of plates by the beam control circuit 88 so as to cause the electron beam e to sweep out a raster composed of parallel scan lines L (FIG. 3) on the imaging frame 34a positioned at plane R, penetrating that frame's layer 106 to an exactly known depth. Where the beam impinges the frame, secondary electrons are emitted from layer 106a at that point. The electron beam operates at the so-called second crossover point so that each primary electron results in the emission of one secondary electron from layer 106. These secondary electrons form a return beam e′ which is modulated by the number of charges representing the electronic image stored on surface 106d with its counter-charges at the underside 106c of that frame 34a. In other words, the numbers of secondary electrons emitted at each point on frame 34a impinged by the primary electron beam will depend upon the number of charges and counter-charges stored at that point on layer 106. More specifically, where the number of stored electronic charges on layer 106 is larger, corresponding to a fiducial mark 128 or the lighter areas of the acquired optical image, there will be fewer electrons needed in the primary beam to achieve the signal level carried in the secondary emission e′. There is likewise an increase in the number of primary electrons in the scanning beam from a point on the swept frame area where there are fewer stored charges, corresponding to a darker area of the stored image.

The secondary electrons comprising the return beam e′ strike collector 94. Readout by secondary electron emission allows the employment in the collector of an optimum performance, low noise amplifier such as a dynode amplifier. This is a known electronic device consisting of a succession of electron emitters arranged so that the secondary electrons produced at one emitter are focused upon the next emitter. This amplifier thus produces a current output which is as much as one million times stronger as the input represented by return beam e′ and thus it also represents the amplified version of the mark 128 and the electronic image stored on the tape frame 34a.

For each frame 34a, the amplified signal from collector 94 includes a very strong component corresponding to the fiducial mark 128 recorded on the margin of that frame and a component corresponding to the electronic image recorded in that frame's image area I. The former component is separated out, say, by threshold detection, and routed to control section 48 where it is used to initialize the beam scan from gun 84 so that the beam scan is always made with reference to the images on the tape rather than to the tape itself. In this way, a slight misposition or skewing of the tape in its movement from plane P to plane R will not affect the readout process.

More particularly, at the outset of each read-out operation, control section 48 causes beam control circuit 88 to execute a search routine whereby that circuit moves the beam e in the X and Y directions over the margin of tape frame 34a until the collector 94 detects strong bursts of secondary electrons at the intersection of the crossarms 128a and 128b which constitutes the zero position of the beam scan. Circuit 88 then causes the primary beam e to track along the X axis arm 128a of the mark which is inherently parallel to the filter stripes 142 through which the image on that frame was exposed. This ensures that when the beam e sweeps over the image area I during read-out, the beam scan lines will be parallel to those frame exposure lines. The circuit 88 then starts the beam scan at the corner of image area I closest to the mark 128 which is offset a constant distance from the aforesaid zero position, i.e., the "electronic cross-hairs" 128a and 128b.

During the scan of image area I, the picture signal component from collector 94 is applied to an A/D converter included in read-out circuit 96 in housing compartment 98 and is otherwise processed by circuit 96 to provide a picture signal. When a color image is being read from a frame 34a, control circuit 88 controls the electron gun 84 so that the electron beam e scans the electronic image on frame 34a in three successive operations. First the beam scans the frame where it was exposed through all of the red filter lines (R); then it scans the frame lines that were exposed through the green filter lines (G), and finally it scans the portions of the frame area that were exposed through the blue filter lines (B). The three successive scans produce a set of red, green and blue picture signals corresponding to the image on that frame. These signals are digitized and, after being color corrected in circuit 96, they may be applied to terminal 20 (FIG. 1) to print or display a color picture corresponding to the image stored on tape 34. Alternatively, if separate long-term storage of the picture signals read from the tape frame is required, the signals may be applied via connector 21a to a conventional video disc or video tape drive.

The initial zeroing of the electron beam e that scans the tape frame to be read at plane R using the electron fiducial mark 128 recorded along with that image assures that the scanning electron beam e will sweep across the tape frame in register with the lines on that frame that were exposed through the color filter stripes 142 when the tape frame was at plane P. If desired, however, additional beam control may be obtained by recording tiny fiducial marks 160 (FIG. 5) on a non-imaged side margin of the tape frame which are congruent with each red, green and blue filter stripe 142 when the frame 34a is positioned at focal plane P. In this event, the read-out circuit 96 would include a discriminator to separate the color picture signals read from the image area I of film frame 34a and the scan line position signals read from that frame outside the area I. The latter signals are then processed by electron gun control circuit 88 to control, in a correctional feedback arrangement, the deflection voltages applied to the electron gun's deflection plates 84c and 84d to correct for any misregistration of the scanning beam e with the frame lines corresponding to the color filter stripes 142.

The detection threshold of collector 94, i.e. its sensitivity, is such that each individual secondary electron can be detected and amplified so that the amplification factor of the resultant signal from collector 94 can be as high as $10^6$ or more. Thus, the read-out process carried out by instrument 10 involving detection of secondary electrons emitted from tape 34 is totally different from the prior scanning methods described at the outset which detect a capacitively modulated current signal from a recording medium. By detecting and simply counting individual electrons in a return beam instituted by the charge distribution on tape surface 106d of frame 34a, rather than current flow through the frame, the present apparatus can take advantage of the highly sensitive defect-free nature of the tape frame 34a, to produce a picture signal which has extremely high resolution and information content. Furthermore, it can accomplish this at a lower read-out or scanning voltage, thereby conserving battery power.

In some aplications, the scan control circuit 88 can be arranged to control the beam from gun 84 so that it scans two different rasters. A rough scan, say, every other or every third color line, may be executed for each color to provide picture signals suitable for previewing on terminal 20 to see if the correct image is being read-out. Then, if the image is correct, a regular scan at the finer resolution may be performed to reproduce a hard copy of that image.

In a preferred embodiment of my system, means are provided for increasing the beam current in the beam e from gun 84 while that beam dwells at each picture element or pixel in its scan across frame 34a so as to extend the dynamic range of the system's charge detection capabilities. This is desirable if more charges per pixel are present on the tape frame than can be handled by the usual lower beam current. More particularly, the read-out circuit includes a threshold detector which counts the number of secondary electrons emitted from each pixel over a time period equivalent to a fraction, e.g. one-half, of the dwell time of the beam at that pixel. If the threshold is exceeded, the detector issues a signal to control section 48 causing that section to double the current in the beam from gun 84 for the remainder of the dwell time at that pixel. Such doubling will thereupon increase the dynamic range of the system by a factor of 10 to ensure that it will not be saturated or overloaded by especially strong image signals on the tape.

Unlike prior systems, when instrument 10 scans a frame 34a during read-out, it does not destroy the electronic image stored on that frame. On the contrary, it automatically refreshes that image which can thus be read over and over again. This is because during scanning, which takes place in the darkness of compartment 86, there are no photo-induced electron-hole pairs produced in the medium's modulator 104; nor is there any buildup of charge on the medium's layer 106 since the beam operates, by choice, at the second crossover point as mentioned above. Resultantly, the positions of the positive charge carriers (holes) at the underside 106c of storage zone 106a remains undisturbed, while the negative charges at the surface 106d of that layer are continually replenished by electrons in the electron beam to maintain a charge balance across the layer 106 at each point thereon as depicted in FIG. 11. As a consequence, the field strengths of the charge domains distributed on layer 106 of each frame 34a are maintained, allowing theoretically infinitely repeated read-outs of that frame.

Indeed, the electronic images stored on unread frames 34a can be refreshed or renewed from time to time by repositioning each such frame at focal plane P and flooding it again with electrons from electron source 74 with the switch 122 (FIG. 4) remaining open so that that frame's conductive layer 104a is not grounded. Those beam electrons will replace any electrons on the outer surface 106d of storage layer zone 106a that may have leaked away over time so that the negative charge distribution on that surface willagain correspond to the distribution of positive carriers still present at the undersurface 106c of that zone.

Instead of retrieving the image stored on the tape 34a by electron beam scanning as shown, the tape can also be read by detecting so-called "tunnel electrons" using a sensing needle that is caused to scan across the surface 106d of tape layer 106. As the needle moves across that surface, an electron cloud is present in the gap between that surface and the needle tip as a consequence of the stored electrons' wave-like properties. Resultantly, there is a voltage-induced flow of electrons through the cloud which varies from point to point on the tape, depending on the charge stored thereat. This electron tunnelling and detection phenomenon is described in greater detail in *Scientific American*, August 1985, pp. 50–56. Using this technique, electrons can be "picked off" the frame surface 106d at each point on the frame to produce picture signals corresponding to the image recorded on the frame.

Microscope-camera 10 with its recording medium can be used in a variety of ways. It can be used for long or short term data storage, as described above. It can also be used for buffer storage or to effect comparisons between the same optical image recorded at different times. For example, a picture of specimen S recorded on one tape frame 34a can be read-out to one channel of a terminal 20 with a two channel capability. Then, the same specimen can be recorded at a later time on another tape frame 34a and immediately read-out to the other channel of terminal 20 so that the two pictures of specimen S can be displayed side by side. The output signals, also produced by instrument 10 during a read-out operation, can be processed digitally using means well known in the color graphics industry to produce an enlargement of the stored image or any selected area thereof or to generate pseudocolor and false color variations of the stored image. In addition, as alluded to above, the present invention can be incorporated into a single lens reflex camera. In this event, the electron gun 84 would be located in the same compartment as the instrument's primary lenses. In other words, the focal plane P and the read-out plane R would be the same. The camera's viewing optics, on the other hand, would be located in a compartment branching from the main compartment 64 with appropriate mirrors and lenses to permit the operator to look through the camera eyepiece to the back of a film frame 34b positioned at the camera's focal plane. Also, an appropriate shutter would be provided to isolate that branch compartment while the aforesaid exposing and read-out processes are carried out in the camera. Also, in such a camera, the filter stripes 142 (R, G, B) can be applied to the exposed surface of the film substrate 102 rather than to platen 36, as described above, to simplify registration of the scanning beam with the filter lines during read-out.

Figure 12:
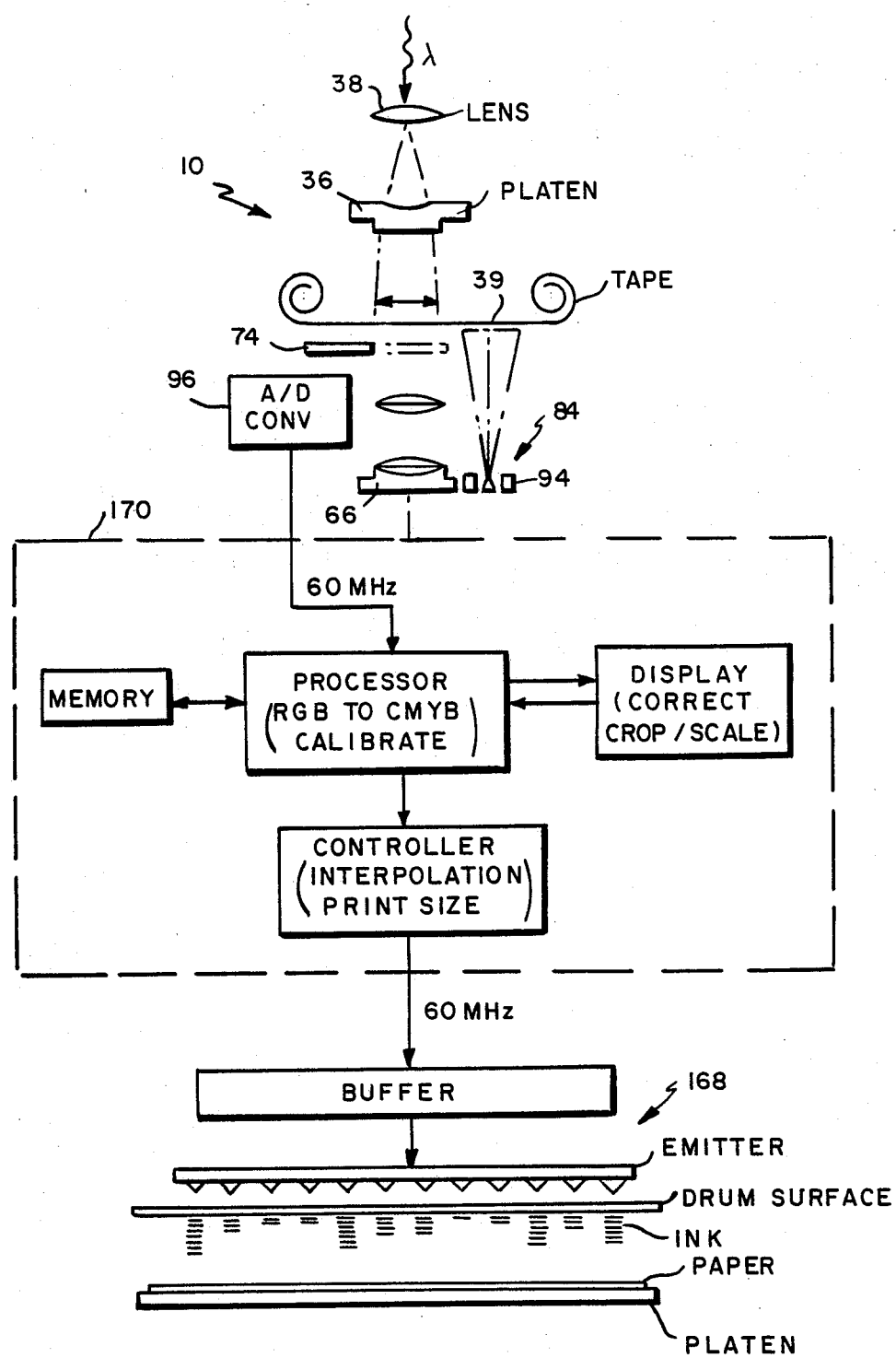
FIG. 12 is a diagrammatic view of a complete optical image acquisition, storage and printing system embodying my invention.

FIG. 12 illustrates the invention incorporated into a complete integrated computer graphics reproduction system with color correction, scaling and enhancement capabilities whose output is high quality color copies of optical images on paper. In this system, the image-representing read-out signals from instrument 10 are applied to a buffered color printer 168 by way of a conventional color graphics processor workstation 170 such as available from computer manufacturers. The printer preferred for this system is applicant's high temperature electrostatic printer which is capable of utilizing the unusually high resolution and noise-free picture data delivered by microscope-camera 10 to produce high quality color prints of that information on ordinary paper.

It will thus be seen that the objects set forth above, among those made apparent from the preceding description, are efficiently attained. Also, certain changes may be made in the method described above and in the above construction without departing from the scope of the invention. For example, as noted at the outset, the optoelectronic medium 34a need not be in the form of a flexible tape; it could also be implemented as a rigid or floppy disk, a drum, a rigid plate or a microfiche. Therefore, it is intended that all matter contained in the above description or shown in the accompanying drawings be interpreted as illustrative and not in a limiting sense.

It is also to be understood that the following claims are intended to cover all of the generic and specific features of the invention herein described.

What is claimed as new and desired to be secured by Letters Patent of the United States is:

1. An electronic read/write system comprising
   A. a housing;
   B. lens means mounted in a wall of the housing for imaging a field of view at a focal plane in the housing;
   C. means in the housing for positioning a wholly inorganic plural-layer optoelectronic medium in said plane; and
   D. electron generating means mounted in said housing and spaced opposite said plane, said electron generating means including
      (1) means for producing a cloud of electrons from a first source to controllably charge an optoelectronic medium in said plane while the medium is simultaneously exposed to a light image in the field of view of said lens means whereby an electronic latent image of the field of view is generated and stored in the medium,
      (2) means for producing a finely focused electron beam for scanning the medium so as to sweep out a raster on the medium whereby to produce a return beam of secondary electrons which is then modulated by the number of exposure generated charges representing said electronic image on the medium, and
      (3) means for collecting said secondary electrons to produce an electrical signal representative of the electronic image stored on the medium.

2. The system defined in claim 1 wherein said lens means include light sensing means which in combination with said producing means control the electronic exposure of the medium thereby eliminating the requirement of a mechanical shutter in said system.

3. The system defined in claim 1 and further including viewing optics mounted in the housing and focused onto said focal plane.

4. The system defined in claim 3 and further including an optoelectronic medium in the form of a flexible tape composed wholly of inorganic materials and positioned in said housing by the positioning means, said tape being composed of transparent viewing frames and photosensitive imaging frames interspersed along the tape.

5. The system defined in claim 1 and further including
   A. a power supply including a battery in said housing;
   B. a control circuit including a microprocessor in said housing;
   C. light energy and image contrast measuring means; and
   D. means for electrically interconnecting said electron generating means, measuring means, power supply and control circuit.

6. The system defined in claim 1 and further including a medium in the form of a flexible tape;
   A. composed wholly of inorganic materials;
   B. including a conductive layer, a photosensitive layer and a dielectric storage layer in that order; and
   C. positioned at said focal plane by the positioning means and to receive said light image at said plane along with an amount of electrons from said generating means proportional to the photons representing said image, whereby said tape stores said image as a spatial electronic charge intensity variation within said storage layer.

7. The system defined in claim 6 wherein said storage layer is a dual-material layer with anisotropic electrical properties regarding the mobility of charges in said storage layer.

8. The system defined in claim 7 and further including charge bias removal means for discharging the outer surface of said storage layer containing said image to inhibit the flow of dark current charges toward the stored image charges from said photosensitive layer thereby preventing the electrical degradation of said image on the tape.

9. An electronic microscope and/or camera system comprising
   A. a housing;
   B. means defining a compartment in said housing;
   C. lens means removably mounted in a wall of the housing for projecting an image of a field of view along an axis to a focal plane in said compartment;
   D. tape transport means positioned in said compartment and for moving optoelectronic tape between said spools along said plane;
   E. electron generating means in said housing, said generating means including means positioned in said compartment opposite said plane and controllably emitting a cloud of electrons in proportion to the light intensity and contrast in the projected image to charge the tape portion in said plane which is exposed to the projected image thereby recording an equivalent electronic image in said tape portion;
   F. electron beam generating means in said housing for scanning the tape portion with a focused electron beam so as to sweep out a raster on the tape portion whereby to produce a return beam of secondary electrons which is modulated by the varying charge densities representing picture elements within said electronic image on said tape portion; and G. means for collecting and amplifying the return beam to produce an electrical signal representative of the electronic image stored on the tape portion.

10. The system defined in claim 9 wherein
   A. said compartment-defining means include a transparent tape-supporting platen located on said axis and defining said plane; and
   B. said compartment is maintained under a high vacuum.

11. The system defined in claim 10 and further including a multiplicity of parallel, contiguous, thin, optical filter lines covering a surface of said platen, said lines
   A. being responsive to different light frequencies of the electromagnetic spectrum;
   B. being arranged in a repetitive color response sequence on the platen;
   C. being congruent with the raster lines swept out by the focused electron beam when scanning the tape.

12. The system defined in claim 9
   A. wherein said beam generating means include
   (1) electron-deflection means, and
   (2) means for controlling the deflection means in response to raster position signals; and
   B. means for sensing one or more electronic fiducial marks on the imaged tape portion to produce a tape position signal and/or a beam position signal for zero-setting the beam scan.

13. The system defined in claim 12 and further including means for varying the beam-current while dwelling on each picture element position in said tape portion so as to extend the dynamic range of charge detection if more charges per picture element are present than can be handled with a steady state beam current.

14. The system defined in claim 12 the means for controlling cause the electron beam to scan selectively at a relatively low and a relatively high resolution to provide image representing electrical signals from the collecting means suitable to drive a CRT and a printer respectively.

15. The system defined in claim 10 wherein said transport means include
   A. a pair of rotary spools for securing the opposite ends of tape;
   B. guide means for guiding tape from said spools to said platen;
   C. drive means for moving tape between said spools along said platen; and
   D. means for applying an electrical current to said drive means.

16. The system defined in claim 15 and further including means for applying opposite voltages to the tape and platen to electrostatically lift the tape from the platen when the tape is moving, but to electrostatically attract the tape into intimate contact with the platen when the tape is being exposed or scanned.

17. The system defined in claim 15 wherein said current-applying means include
   A. a power supply including a battery in said housing;
   B. a control circuit including a microprocessor in said housing;
   C. means for electrically interconnecting said drive means, power supply and control circuit; and
   D. switch means mounted in an exterior wall of said housing for actuating the control circuit.

18. The system defined in claim and further including
   A. means for sensing the intensity and brightness contrast of the projected image and producing intensity and contrast signals in response thereto; and
   B. means responsive to said signals for controlling the charging of said tape portion by said electron generating means.

19. The system defined in claim 18 wherein said light and contrast sensing means include
   A. an array of parallel, straight or wavy photosensitive stripes in said focal plane, each of said stripes providing an electrical indication proportional to the amount of light incident on that stripe; and
   B. means for sampling said indications.

20. The system defined in claim 19 and further including an array of optical filter lines in said focal plane, said filter lines being generally congruent with the raster lines swept out by the focused electron beam when scanning the tape.

21. The system defined in claim 9 and further including
   A. a viewfinder eyepiece mounted in an exterior wall of said housing that comprises said compartment-defining means;
   B. optical means positioned in said compartment for providing a light path between the optical axis of the eyepiece and said lens axis; and
   C. a light shutter in said light path to prevent light shining through said eyepiece from reaching said plane; and
   D. means for opening and closing said shutter.

22. An electronic read/write system as defined in claim 9 and further including
   A. display means;
   B. printing means; and
   C. means electrically connecting said display means, printing means and said system so that the electronic images stored by said system on an optoelectronic medium in said system can be displayed and printed selectively by the display means and printing means.

23. An electronic read/write system comprising
   A. a housing;
   B. a lens system mounted in a wall of the housing for projecting a field of view to a focal plane in the housing;
   C. means in the housing for positioning a plural-layer optoelectronic tape in said plane, said tape including a conductive layer, a photoconductive layer and a dual-material dielectric storage layer;
   D. means in said housing for applying a voltage to the photoconductive layer;
   E. means in said housing for applying electrons in a cloud to the exposed surface of the storage layer; and
   F. means for controlling the voltage applying means and electron applying means to apply a voltage momentarily to the photoconductive layer while the tape is exposed to a light image projected by said lens system that is dependent upon the intensity of the light in, and brightness contrast of, the projected image whereby a perfectly exposed electronic image of the projected image is acquired by the photoconductive layer and stored in the storage layer as a distribution of charge densities;
   G. means for storing the electronic image by allowing the photogenerated charges to tunnel through one component of the dual-material dielectric layer and be pinned in an anisotropic storage position in the other component of said layer, whereas said one storage layer component will inhibit charges generated as a result of heat from reaching the photogenerated charges in said other storage layer component after the exposure of the tape and the application of said voltage are terminated.

24. The system defined in claim 23 and further including
   A. means in said housing for scanning the surface of the dielectric storage layer with a focused electron beam so as to sweep out a raster on said surface whereby to produce a return beam which is modulated by the electronic image charge densities on the dielectric surface of said dual-material dielectric storage layer conformant with the number of charges in said storage layer; and
   B. means in the system housing for collecting and amplifying the return beam to produce an electrical signal representative of the electronic image stored in the tape.

25. The system defined in claim 24 said system housing is maintained continuously under high vacuum.

26. The system defined in claim 23 and further including a plural layer electronic tape mounted in said housing and extending in said plane, said tape comprising
   A. a thin, flexible, optically clear substrate;
   B. a conductive layer covering the substrate and which is connected electrically to the voltage applying means;
   C. a photoconductive laer covering the conductive layer; and
   D. a dual-material dielectric storage layer covering the photoconductive layer, said storage layer including
      (1) an interfacial zone adjacent to and covering the photoconductive layer; and
      (2) a storage zone which is exposed to said electron cloud, said interfacial zone permitting the tunnelling through it of photogenerated charges from the photoconductive layer during exposure of the tape under the influence of a strong electrical field resulting from the deposition of electrons from the electron generating means on the surface of the storage zone and the application of voltage by the voltage applying means to the conductive layer whereby said charges are trapped at anisotropic storage positions in the undersurface of said storage zone.

27. The system defined in claim 26 wherein said interfacial zone also inhibits electrical charges generated in said photoconductive layer after tape exposure when the electric field is not present from reaching said storage zone and upsetting the count of photogenerated charges trapped thereat during exposure of the tape.

28. A method of taking pictures electronically comprising the steps of

A. forming a wholly inorganic, plural layer electronic tape with a photoconductive layer sandwiched between a conductive layer and a dual-material dielectric storage layer;
   B. positioning the tape so that a segment thereof is located in the focal plane of a lens system;
   C. applying a voltage to the photoconductive layer and electrons to the exposed surface of the dielectric layer in said segment that are dependent upon the light intensity of and contrast of a light image projected to said tape segment so that an electronic image of the projected image is acguired by the photoconductive layer and stored in the dual-material dielectric storage layer of said tape segment.

29. The method defined in claim 28 and including the additional steps of
   A. scanning the tape segment with a focused electron beam so as to sweep out a raster on the surface of said storage layer whereby to produce a return beam of secondary electrons which is modulated by the image stored in the tape segment;
   B. collecting the return beam to produce electronic signals representative of the image stored in the tape segment; and
   C. processing said electronic signals so as to reconstitute by printing the likeness of the original optical image projected onto the tape segment.

30. The method defined in claim 29 and including the additional steps of
   A. acquiring and storing a second electronic image on a second different segment of said tape;
   B. scanning the second tape segment in the same manner as the first segment to produce second electronic signals representative of the image stored on the second tape segment; and
   C. processing the second electronic signals in the same manner as the first signals to print the image stored on the second tape segment for purposes of comparison with the printed likeness of the image projected onto the first tape segment.

31. The method defined in claim 28 including the additional steps of
   A. scanning the tape segment with an array of scanning needles whose tips are spaced closely to the segment surface;
   B. applying an electric potential between the tape segment and the needles so that electrons stored in the tape segment tunnel through said storage zone and are emitted by the tape segment toward said needles; and
   C. detecting the number of electrons emitted at each point on the tape segment to develop signals representative of the electronic image stored in that segment.

* * * * *